(12) United States Patent
Taniguchi et al.

(10) Patent No.: US 11,090,846 B2
(45) Date of Patent: Aug. 17, 2021

(54) METHOD FOR MANUFACTURING DECORATIVE MOLDING AND MOLD FOR THE METHOD

(71) Applicant: Nissha Co., Ltd., Kyoto (JP)

(72) Inventors: Takafumi Taniguchi, Kyoto (JP); Tatsuya Nakanishi, Kyoto (JP); Takafumi Matsui, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 371 days.

(21) Appl. No.: 16/120,980

(22) Filed: Sep. 4, 2018

(65) Prior Publication Data

US 2018/0370100 A1 Dec. 27, 2018

Related U.S. Application Data

(63) Continuation of application No. PCT/JP2017/019326, filed on May 24, 2017.

(30) Foreign Application Priority Data

Jun. 29, 2016 (JP) .............................. JP2016-128655

(51) Int. Cl.
*B29C 45/16* (2006.01)
*B29C 45/40* (2006.01)
(Continued)

(52) U.S. Cl.
CPC .......... *B29C 45/1679* (2013.01); *B29C 33/14* (2013.01); *B29C 45/14827* (2013.01);
(Continued)

(58) Field of Classification Search
None
See application file for complete search history.

(56) References Cited

U.S. PATENT DOCUMENTS

| 4,752,059 A | 6/1988 | Oishi et al. |
| 2011/0259572 A1 * | 10/2011 | Muratani .......... B29C 45/14836 264/279 |

FOREIGN PATENT DOCUMENTS

| EP | 1897669 A1 | 3/2008 |
| JP | 58-131039 A | 8/1983 |

(Continued)

OTHER PUBLICATIONS

English translation of JPS58131039A (Year: 1983).*
International Search Report dated Jul. 18, 2017 for corresponding foreign Application No. PCT/JP2017/019326, 2 pp.

Primary Examiner — Timothy Kennedy
Assistant Examiner — Olukorede Esan
(74) Attorney, Agent, or Firm — United IP Counselors, LLC

(57) ABSTRACT

A method for manufacturing a decorative molding in which a transfer layer is transferred onto an injection molded product from a transfer sheet simultaneously with performing of injection molding in which at least one knockout pin in a second half-mold is caused to retreat to clamp a first half-mold and the second half-mold together; and the at least one knockout pin is made to advance so that the first half-mold and the second half-mold are released from each other until the second half-mold and the first half-mold open to a predetermined interval, while the transfer layer in a non-transfer area that is to remain on the transfer sheet is pushed against the first half-mold.

16 Claims, 16 Drawing Sheets

(51) Int. Cl.
*B29C 45/14* (2006.01)
*B29C 33/14* (2006.01)
*B29C 45/26* (2006.01)
*B29L 31/34* (2006.01)

(52) U.S. Cl.
CPC .............. *B29C 45/26* (2013.01); *B29C 45/40* (2013.01); *B29C 45/401* (2013.01); *B29C 45/4005* (2013.01); *B29L 2031/3481* (2013.01)

(56) References Cited

FOREIGN PATENT DOCUMENTS

| | | | | |
|---|---|---|---|---|
| JP | S58131039 A | * | 8/1983 | ............ B29C 35/00 |
| JP | 62-95209 A | | 5/1987 | |
| JP | 63-018224 U | | 2/1988 | |
| JP | 2010-173167 A | | 8/2010 | |
| WO | 2007/000930 A1 | | 1/2007 | |

* cited by examiner

FIG. 12A
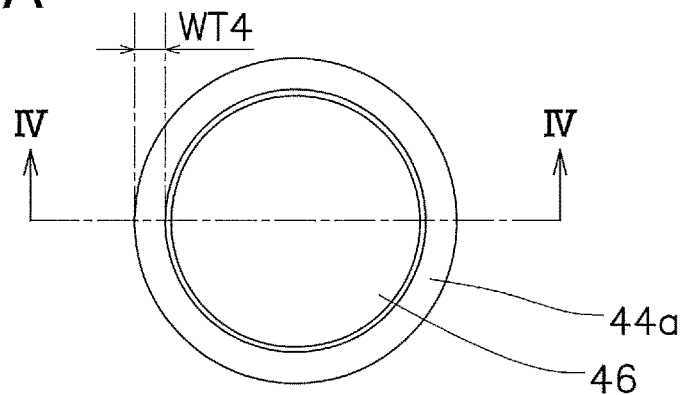
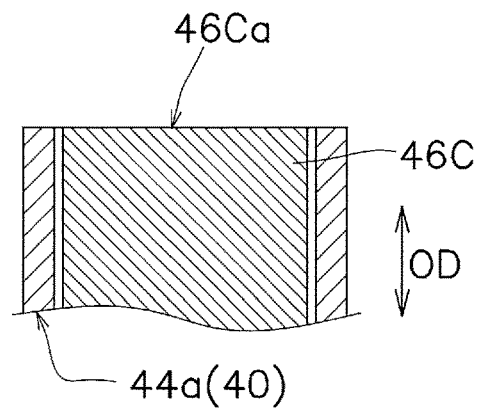
FIG. 12B
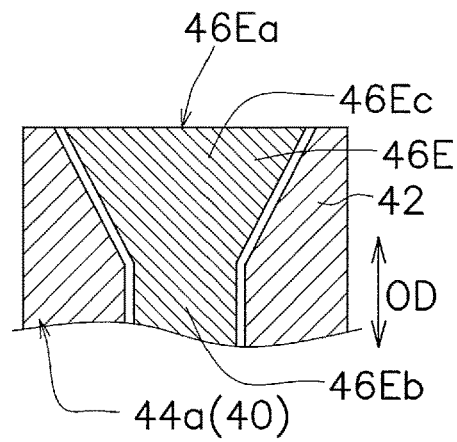
FIG. 12D
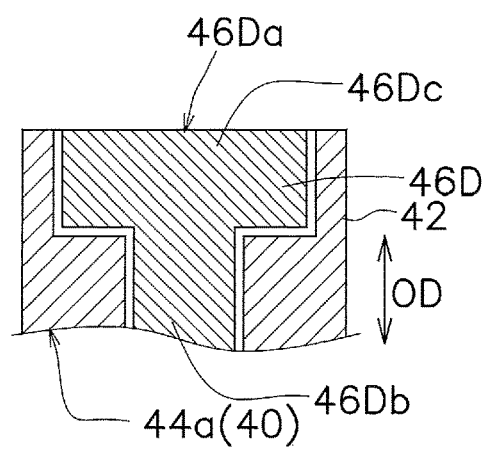
FIG. 12C
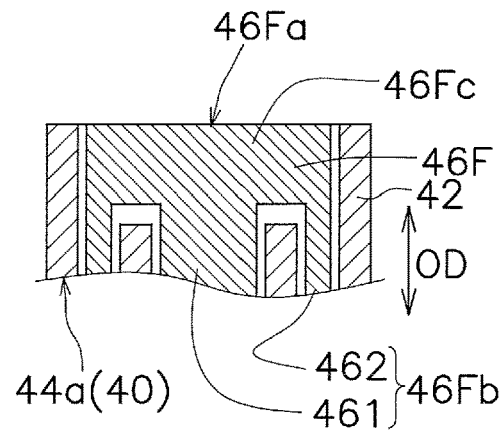
FIG. 12E

METHOD FOR MANUFACTURING DECORATIVE MOLDING AND MOLD FOR THE METHOD

CROSS-REFERENCE TO RELATED APPLICATIONS

This application is a continuation application of International Application No. PCT/JP2017/019326, filed on May 24, 2017, and claims priority under 35 U.S.C. § 119 to Japanese Patent Application No. 2016-128655, filed on Jun. 29, 2016. The entire disclosures of both applications are hereby incorporated herein by reference in their entireties.

BACKGROUND

Technical Field

The present disclosure relates to a method for manufacturing a decorative molding by decorating simultaneously with injection molding, and a mold that is suited to the method.

Background Information

Up until now, the following method for manufacturing a decorative molding has been used: a decoration is transferred onto a surface of an injection-molded from a transfer sheet product simultaneously with injection molding, to thereby decorate the injection molding simultaneously with injection molding. This method is known as "in-mold transfer printing." In such a method for manufacturing a decorative molding that uses a transfer sheet, the following faults sometimes occur. That is, a transfer layer in a non-transfer area that should remain on the transfer sheet without being transferred remains on the decorative molding, or the transfer layer in the non-transfer area splatters over the mold. Therefore, the transfer layer in the non-transfer area (hereinafter referred to as "foil burr") that remains on the decorating molding, for example, must be removed by a worker, which increases manufacturing costs. In addition, foil burr that has splattered over a mold results in defective products, which also increases manufacturing costs.

In light of the above, there is disclosed in, for example, Patent Literature 1 (Japanese Patent Unexamined publication No. 2010-173167) a method for manufacturing a decorative molding that reduces the generation of foil burr around a molding through use of a frame-shaped slide core that forms cavity contours.

However, with the method for manufacturing a decorating molding according to Patent Literature 1, the mold is a special and expensive mold that uses the frame-shaped slide core. While the above-mentioned method can be used to reduce the generation of foil burr around decorative moldings, foil burr that occurs at an opening of the decorative molding, for example, cannot be reduced with the above-mentioned method. In addition, sometimes a slide core cannot be used depending on the rear surface shape of the decorative molding, or if the shape of the decorative molding is distorted.

BRIEF SUMMARY

It is an object of the present disclosure to provide a method for manufacturing a decorative molding and a mold for the method that can reduce, at low cost, foil burr that occurs when a decorative molding is injection molded.

A plurality of aspects of the present disclosure are described below as means for solving the problem. The following aspects can be freely combined as necessary.

In a method for manufacturing a decorative molding according to one aspect of the present disclosure, a transfer sheet including a transfer layer that has a transfer area to be transferred onto an injection molded product and a non-transfer area that is not to be transferred onto the injection molded product is placed on a first half-mold; the transfer layer is transferred onto the injection molded product from the transfer sheet simultaneously with performing of injection molding in which at least one knockout pin located in a second half-mold is caused to retreat to clamp the first half-mold and the second half-mold together; and the first half-mold and the second half-mold are released from each other while the at least one knockout pin is caused to advance until the second half-mold and the first half-mold open to a predetermined interval and the transfer layer in the non-transfer area that is to remain on the transfer sheet is pressed against the first half-mold using the at least one knockout pin.

According to this method for manufacturing a decorative molding, the at least one knockout pin can be caused to advance when the molds are released from each other in a state where the transfer layer in the non-transfer area that is to remain on the transfer sheet is sandwiched between at least one knockout pin and the first half-mold after the layer being transferred simultaneously with performing of the injection molding by clamping the first half-mold and the second half-mold, to thereby separate the transfer layer in the non-transfer area from the decorative molding. As a result, it is possible to reduce the chance of the transfer layer in the non-transfer area from being left on the decorative molding as foil burr and from splattering onto the first half-mold and the second half-mold.

In the above-mentioned method for manufacturing a decorative molding, when the first half-mold and the second half-mold are clamped together, at least one opening can be formed in the injection molded product through performing of the injection molding by causing a first area in a first half-molded surface of the first half-mold that is used to form one primary surface of the injection molded product to make close contact with a second area in a second half-molded surface of the second half-mold that is used to form another primary surface of the injection molded product, with the transfer sheet sandwiched between the areas, and the at least one knockout pin can be caused to advance from the second area when the first half-mold and the second half-mold are released from each other, to thereby push the non-transfer area of the transfer sheet that corresponds to the at least one opening against the first half-mold with the at least one knockout pin. With this configuration, so that foil burr is not formed at the opening when forming the at least one opening in the injection molded product, the at least one knockout pin that advances from the second area pushes the non-transfer area against the first area, and the transfer layer in the non-transfer area that corresponds to the opening can be left in the transfer sheet.

In the above-mentioned method for manufacturing a decorative molding, the at least one knockout pin can include a plurality of first knockout pins; the at least one opening can be formed in the injection molded product through performing of the injection molding by clamping the first half-mold and the second half-mold together with the transfer sheet sandwiched therebetween, causing the first area of the first half-mold and the second area of the second half-mold to make close contact, causing the at least one knockout pin to retreat, and pushing the transfer sheet against the first area with the plurality of first knockout pins; the plurality of first knockout pins can be caused to advance from the second area when the first half-mold and the second half-mold are released from each other; and the non-transfer area in the transfer sheet can be pushed against the first area by the plurality of first knockout pins. With this configuration, because the plurality of first knockout pins per one opening push the transfer sheet against the first area, the plurality of first knockout pins can be arranged in accordance with the shape of the opening, and the generation of foil burr can be substantially reduced regardless of the shape of the opening. In addition, while holes used for arranging the plurality of first knockout pins are provided in the second area, it is possible that areas of the second half-mold where the plurality of first knockout pins are not arranged are connected with each other, and hence a loss of strength in the second half-mold can be reduced while still achieving the effect of decreasing foil burr.

A mold according to one aspect of the present disclosure includes a first half-mold on which a transfer sheet is to be placed, the sheet including a transfer layer that has a transfer area to be transferred onto an injection molded product simultaneously with performing of injection molding, and a non-transfer area that is not to be transferred to the injection molded product, and a second half-mold that is clamped to the first half-mold, the second half-mold including at least one knockout pin that is configured to freely advance and back in order to push the transfer layer in the non-transfer area that is to remain on the transfer sheet against the first half-mold until the first half-mold and the second half-mold open to a predetermined interval when the molds are released from each other.

According to the above-described mold, the at least one knockout pin can be caused to advance when the molds are released from each other in a state where the transfer layer in the non-transfer area that is to remain on the transfer sheet is sandwiched between at least one knockout pin and the first half-mold after the layer being transferred simultaneously with performing of the injection molding by clamping the first half-mold and the second half-mold, to thereby separate the transfer layer in the non-transfer area from the decorative molding when the molds have opened to the predetermined interval. As a result, it is possible to reduce the chance of the transfer layer in the non-transfer area from being left on the decorative molding as foil burr and from splattering onto the first half-mold and the second half-mold.

In the above-described mold, the first half-mold includes, in the first half-molded surface that is used to form the one primary surface of the injection molded product, the first area that corresponds to the at least one opening in the injection molded product, and the second half-mold includes, in the second half-molded surface that is used to form the other primary surface of the injection molded product, the second area that makes close contact with the first half-mold with the transfer sheet being sandwiched the areas when the molds are clamped together. The at least one knockout pin can be arranged in the second area, and the at least one knockout pin can protrude from the at least one opening when the first half-mold and the second half-mold are released, to thereby press the non-transfer area against the first area in the first half-mold. With this configuration, so that foil burr is not formed at the opening when forming the at least one opening in the injection molded product, the transfer layer remaining in the non-transfer area that corresponds to the opening can be pressed against the first area with the at least one knockout pin that protrudes from the opening, and the transfer layer remaining in the non-transfer area that corresponds to the opening can be left in the transfer sheet.

In the above-described mold, the at least one knockout pin can include the plurality of first knockout pins, and a plurality of first knockout pins for one of the at least one opening can be arranged in the second half-mold. In the mold configured as described above, because a plurality of first knockout pins can be arranged in one of the at least one opening to push the transfer sheet against the first area, the plurality of first knockout pins can be arranged in accordance with the shape of the opening, and the generation of foil burr can be substantially reduced regardless of the shape of the opening. In addition, while holes used for arranging the plurality of first knockout pins are provided in the second area, it is possible that areas of the second half-mold where the plurality of first knockout pins are not arranged are connected with each other, and hence a loss of strength in the second half-mold can be reduced while still achieving the effect of eliminating foil burr.

In the above-described mold, the at least one knockout pin can include a second knockout pin, and a third knockout pin that has an area of a tip surface that is smaller than that of the second knockout pin, the tip areas being configured to abut against the transfer sheet. In the mold configured as described above, the third knockout pin having the tip surface area smaller than that of the second knockout pin can be arranged at a complex place in the non-transfer area, and hence a loss of strength in the mold can be reduced, and it becomes easier to decrease foil burr at the complex place in the non-transfer area.

In the above-described mold, the at least one knockout pin can include a fourth knockout pin that has a tip surface that abuts against the transfer sheet, and a base portion extending inward toward the second half-mold and having a cross-sectional area that is orthogonal to the release direction and smaller than an area of the tip surface. In the mold configured as described above, by reducing the cross-sectional area of the base portion, a loss of strength in the second half-mold can be reduced due to the arrangement of the fourth knockout pins, and by increasing the area of the tip surface, the part that pushes the non-transfer area can be increased, and it becomes easy to improve the effect of reducing foil burr generation.

In the above-described mold, the first half-mold can include a third area and a fourth area, and the second half-mold can include a fifth area that corresponds to the third area, and a sixth area that corresponds to the fourth area. Further, a position of contact between the third area and the fifth area via the transfer sheet when the molds are clamped together can be located closer toward a rear surface of the first half-mold than a position of contact between the fourth area and the sixth area; the at least one knockout pin can include a fifth knockout pin arranged in the fifth area, and a sixth knockout pin arranged in the sixth area; and the first half-mold and the second half-mold can be configured such that, at substantially the same time as when the fifth knockout pin pushes the transfer sheet against the third area, the sixth knockout pin pushes the transfer sheet against the fourth area. In the mold configured as described above, because the fifth knockout pin and the sixth knockout pin can press the transfer sheet against the third area and the fourth area in the first half-mold at the same time, compared to a case in which the transfer sheet is pushed at different times, the transfer sheet wrinkles less easily, and defective products can be decreased.

In the above-described mold, the first half-mold can include a non-flat seventh area in the first half-molded surface, and the at least one knockout pin can include a seventh knockout pin that is arranged in the seventh area and has a tip surface with a non-flat shape that is substantially the same as that of the seventh area. In the mold configured as described above, the transfer sheet can be sandwiched between the seventh area of the first half-mold and the tip surface of the seventh knockout pin with substantially no space therebetween. As a result, the transfer sheet wrinkles less easily, and defective products can be decreased.

According to a method for manufacturing a decorative molding or a mold for the method according to the present disclosure, foil burr that occurs when a decorative molding is injection molded can be reduced at low cost by using at least one knockout pin that pushes a transfer layer in a non-transfer region that should remain on a transfer sheet against a first half-mold.

BRIEF DESCRIPTION OF THE DRAWINGS

Referring now to the attached drawings which form a part of this original disclosure:

FIG. 12A is an enlarged plan view of the second half-mold for illustrating a second arrangement example of the knockout pins;

FIG. 12B is an enlarged cross-sectional view for illustrating the knockout pin along the line IV-IV in FIG. 12A;

FIG. 12C is enlarged cross-sectional view for illustrating another knockout pin along the line IV-IV in FIG. 12A;

FIG. 12D is enlarged cross-sectional view for illustrating yet another knockout pin along the line IV-IV in FIG. 12A;

FIG. 12E is enlarged cross-sectional view for illustrating yet another knockout pin along the line IV-IV in FIG. 12A;

DETAILED DESCRIPTION OF THE EMBODIMENTS

A method for manufacturing a decorative molding and a mold suited to the method according to one embodiment of the present disclosure are described below. The decorative molding is briefly described before describing the method and the mold.

(1) DECORATIVE MOLDING

Figure 1:
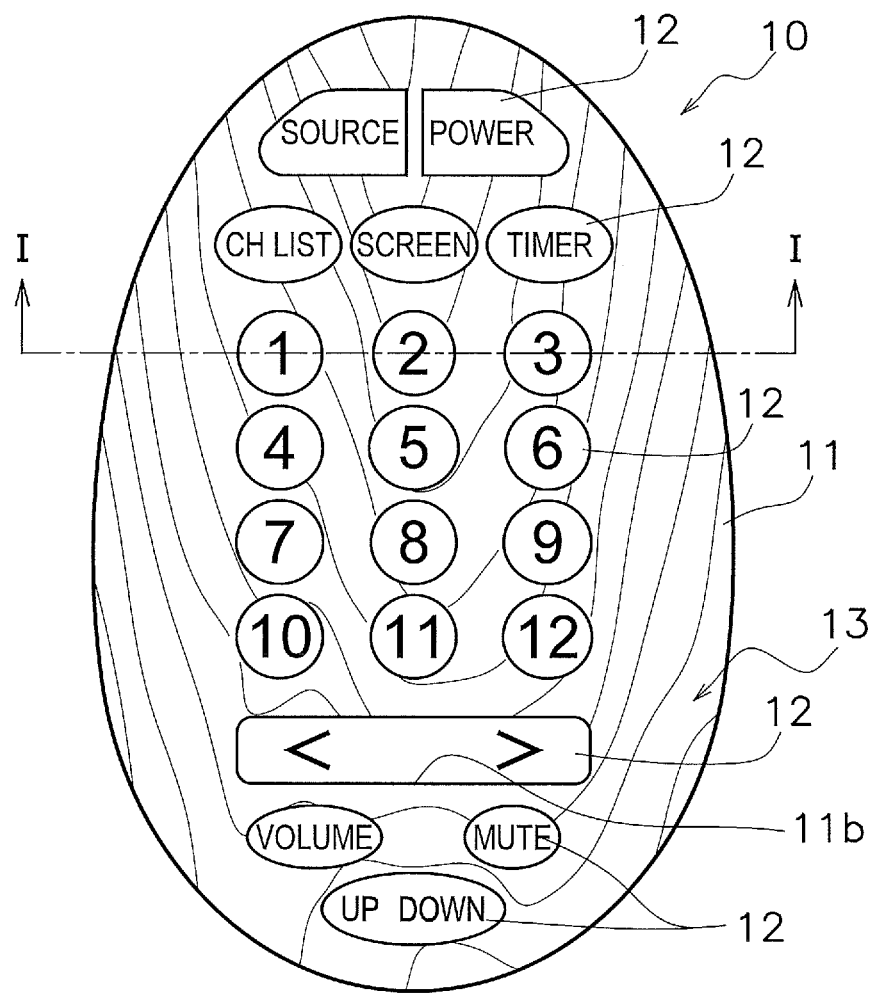
FIG. 1 is a plan view for illustrating a remote controller according to one embodiment of the present disclosure.
Figure 2:
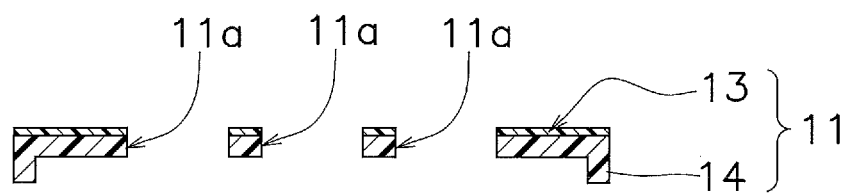
FIG. 2 is a cross-sectional view for illustrating a case lid of the remote controller along the line I-I of FIG. 1.

FIG. 1 illustrates a remote controller that is used for, for example, a television. A resin case lid 11 of a remote controller 10 corresponds to the decorative molding. FIG. 2 schematically illustrates a cross section of the case lid 11 along the line I-I in FIG. 1. Openings 11a that receive operation buttons 12 on the remote controller 10 are formed in the case lid 11. A decorative layer 13 that has a wood pattern is transferred onto an upper surface of the case lid 11. In other words, the case lid 11 includes a resin injection molded product 14 that is formed by injection molding, and the decorative layer 13 that is formed on the surface of the injection molded product 14. The decorative layer 13 is a decorative layer that is transferred simultaneously with injection molding.

(2) OVERVIEW OF INJECTION MOLDING DEVICE AND MOLD CONFIGURATIONS

Figure 3:
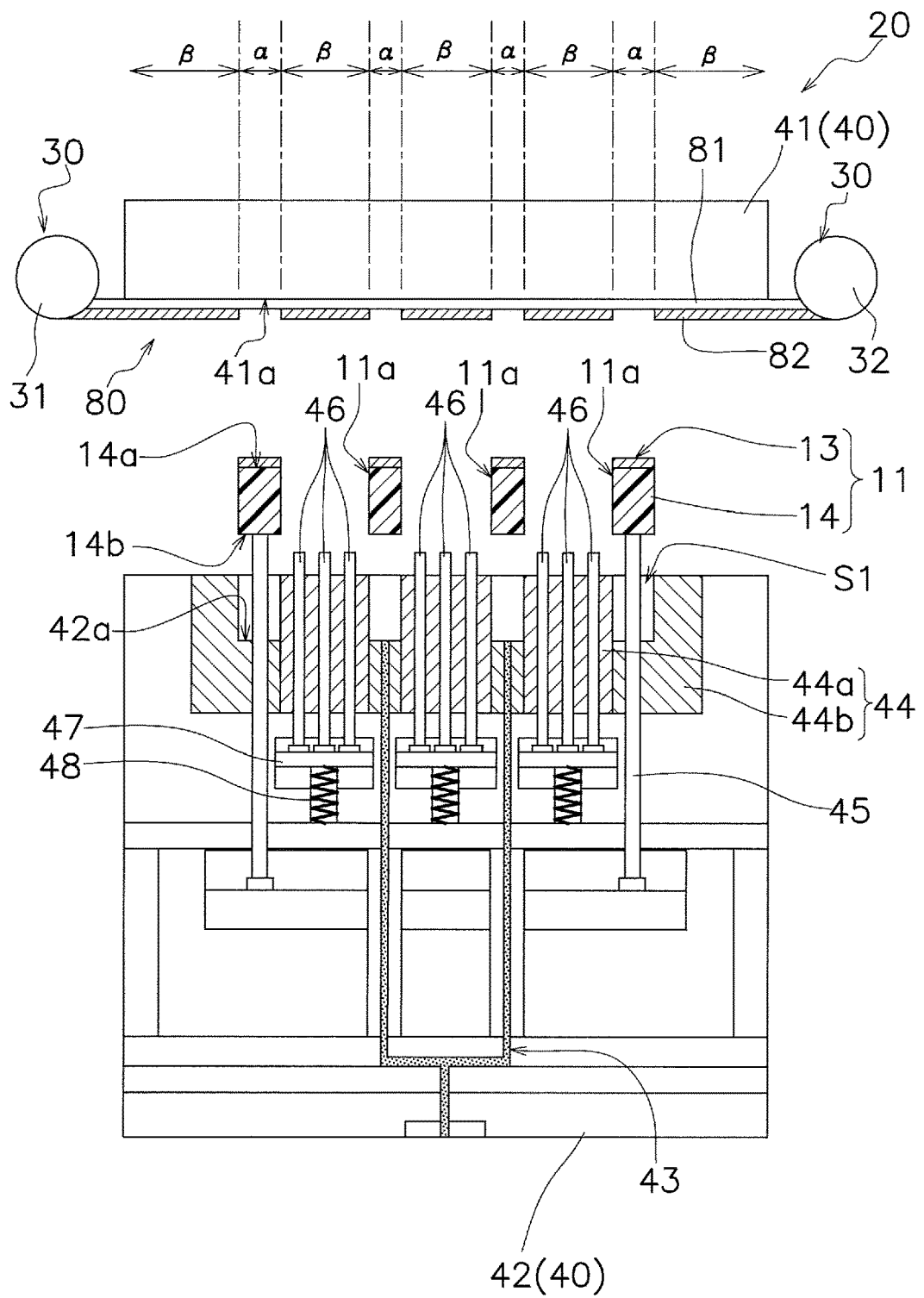
FIG. 3 is a schematic cross-sectional view for illustrating a mold in a removal step for a decorative molding.

FIG. 3 schematically illustrates an overview of an injection molding device. An injection molding device 20 includes a foil feed device 30 and a mold 40. The mold 40 includes a first half-mold 41 and a second half-mold 42. The injection molding device 20 also includes other components, such as a cylinder configured to inject molten resin into the mold 40, and a clamping mechanism that drives the mold 40, but a description of such components identical to those used in conventional devices is omitted from this description.

(2-1) Foil Feed Device 30

The foil feed device 30 includes a feed roller 31 and a winding roller 32 for feeding a transfer sheet 80. The foil feed device 30 also includes tension imparting means for feeding the transfer sheet 80 with a given tension. In order to impart tension on the transfer sheet 80, for example, the feed roller 31 is provided with a torque control mechanism. With such a configuration, the feed roller 31 corresponds to the tension imparting means. Feeding the transfer sheet 80 with a given tension in the foil feed device 30 lowers the chance of the transfer sheet 80 from wrinkling.

(2-2) Mold 40

In the mold 40, the first half-mold 41 and the second half-mold 42 are clamped together to form a mold cavity S1 into which the molten resin is injected. The injection molded product 14 is formed of the molten resin that has been injected into the mold cavity S1. One principle surface 14a of the injection molded product 14 is formed by the first half-mold 41, and another principle surface 14b of the injection molded product 14 is formed by the second half-mold 42. More specifically, the one principle surface 14a of the injection molded product 14 is formed by a first half-molded surface 41a of the first half-mold 41, and the another principle surface 14b of the injection molded product 14 is formed by a second half-molded surface 42a of the second half-mold 42. In FIG. 3, the first half-molded surface 41a of the first half-mold 41 is illustrated as a flat surface, but can be a convex, concave, or uneven shape, and the surface thereof can be curved. Similarly, the second half-molded surface 42a of the second half-mold 42 is illustrated as a flat surface, but can be a convex, concave, or uneven shape, and the surface thereof can be curved.

The transfer sheet 80 is to be placed on the first half-mold 41. The transfer sheet 80 includes a base film 81 and a transfer layer 82. The transfer layer 82 of the transfer sheet 80 includes a transfer area α that is to be transferred onto the injection molded product 14 simultaneously with performing of the injection molding, and a non-transfer area 13 that is not to be transferred onto the injection molded product 14.

The second half-mold 42 includes a runner portion 43, an insert 44 into which the second half-molded surface 42a is engraved, an ejector pin 45, and a plurality of knockout pins 46. The runner portion 43 is a passage for guiding the molded resin into the mold cavity S1. The insert 44 is the portion of the second half-mold 42 indicated by the diagonal lines. In FIG. 3, the cross section of the second half-mold 42 around the insert 44 is not illustrated with diagonal lines to make the drawing easier to read. The insert 44 includes a first insert 44a in which the knockout pins 46 are provided, and a second insert 44b in which the knockout pins 46 are not provided. The ejector pin 45 serves to push out the case lid 11, which is the decorative mold, from the second half-mold 42 when the first half-mold 41 and the second half-mold 42 are released.

Among the knockout pins 46 provided in the second half-mold 42, nine knockout pins 46 are illustrated in FIG. 3. The plurality of knockout pins 46 provided in the second half-mold 42 are arranged into groups accordance with a plurality of the openings 11a. More specifically, three knockout pins 46 are arranged in each of the three openings 11a illustrated in FIG. 3. A common metal plate member 47 is attached to each of the sets of three knockout pins 46 that are arranged to correspond to each of the openings 11a. Each of the sets of knockout pins 46 is biased at the same time by springs 48 that are provided between the metal plate members 47 and the second half-mold 42. With this configuration of the knockout pins 46, the metal plate members 47, and the springs 48, the knockout pins 46 can freely advance and retreat.

(3) METHOD FOR MANUFACTURING DECORATIVE MOLDING

Next, a method for manufacturing a decorative molding using the above-mentioned injection molding device 20 is described with reference to FIGS. 3 to 12. The step illustrated in FIG. 3 is a step of releasing the first half-mold 41 and the second half-mold 42, and removing the case lid 11 that is the decorative molding. The case lid 11 illustrated in FIG. 3 is not provided with a runner, but a decorative molding that is not provided with a runner such as the case lid 11 can be removed by using a valve gate method, for example. For example, by using an open gate method in place of the valve gate method, the decorative molding can be configured so as to be removed while being provided with a runner.

When the case lid 11 illustrated in FIG. 3 is to be removed, the ejector pin 45 is driven by air pressure, hydraulic pressure or a spring, to thereby be housed in the second half-mold 42, and the foil feed device 30 operates. In the foil feed device 30, because the portion at which transfer of the transfer sheet 80 is completed is removed from the first half-mold 41 and the next portion to be transferred is arranged in the first half-mold 41, the transfer sheet 80 is fed from the feed roller 31 and wound by the winding roller 32, to thereby move the transfer sheet 80.

Figure 4:
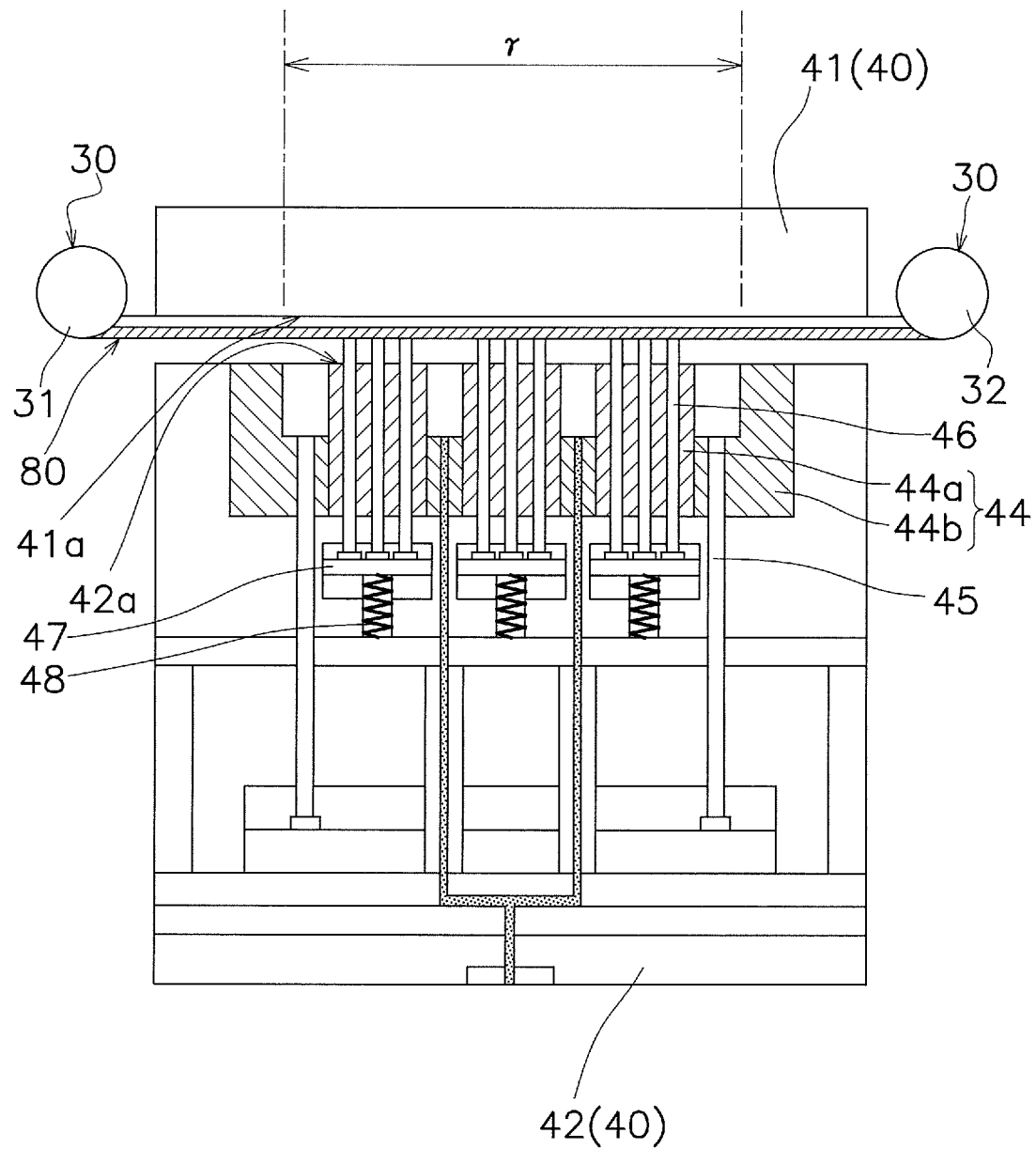
FIG. 4 is a schematic cross-sectional view for illustrating a mold to be clamped.
Figure 5:
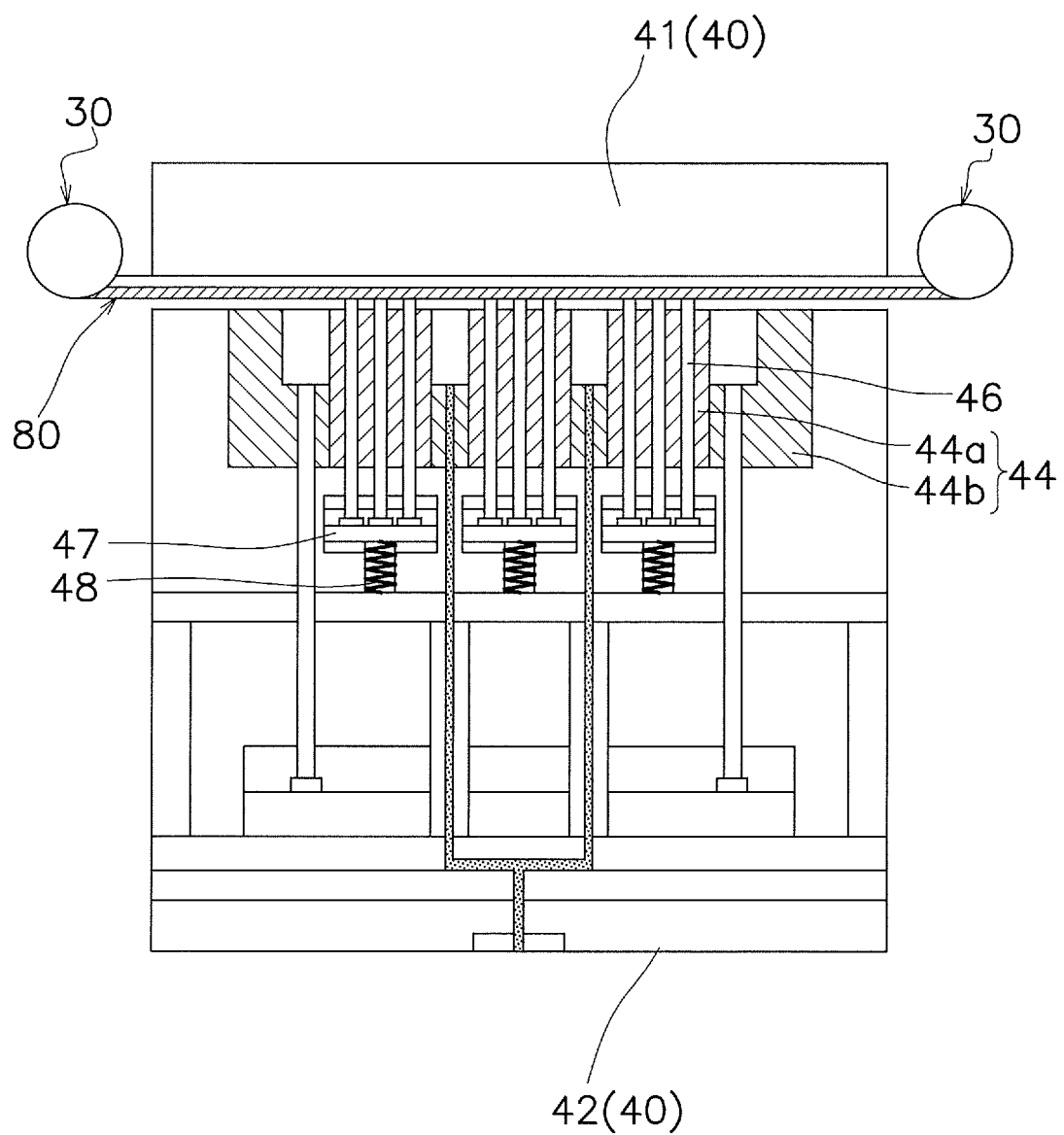
FIG. 5 is a schematic cross-sectional view for illustrating the mold in a state in which a first half-mold has become closer to a second half-mold than in the state illustrated in FIG. 4.

The clamping starts when the placement of the transfer sheet 80 has finished, or while the transfer sheet 80 is being placed. While the first half-mold 41 and the second half-mold 42 are being clamped together, the transfer sheet 80 approaches the second half-mold 42 together with the first half-mold 41. As illustrated in FIG. 4, the transfer sheet 80 is finished being placed before the transfer sheet 80 comes into contact with the knockout pin 46. For example, the transfer sheet 80 is fixed to the first half-mold 41 at a time when the placement of the transfer sheet 80 has finished due to air that exists between the first half-mold 41 and the transfer sheet 80 being sucked through a suction hole (not shown) formed in the first half-mold 41, or the transfer sheet 80 being sandwiched by a clamp (not shown). As illustrated in FIG. 4, the transfer sheet 80 that has moved toward the second half-mold 42 together with the first half-mold 41 is simultaneously pressed against the first half-mold 41 by the plurality of knockout pins 46. The force that pushes the transfer sheet 80 against the first half-mold 41 with the knockout pins 46 is generated by the spring 48 and transferred to the plurality of knockout pins 46 via the metal plate member 47. As illustrated in FIG. 5, the first half-mold 41 is led toward the vicinity of the second half-mold 42, the plurality of knockout pins 46 push the metal plate member 47 by being pushed by the first half-mold 41, and the spring 48 elastically deforms to generate the force that biases the knockout pins 46. Therefore, there is no need to provide an actuator for driving the spring 48, and the mold 40 can be obtained with low cost. In this embodiment, the spring 48 is used, but an actuator driven by, for example, air pressure or hydraulic pressure can be used in place of the spring 48 to advance and retreat the knockout pin 46 at will. For example, when the knockout pins 46 actively operate due to an actuator other than an elastic member such as the spring 48 that does not passively operate, the knockout pins 46 do not need to push the transfer sheet 80 against the first half-mold 41 during clamping, and the knockout pins 46 can be housed in the second half-mold 42 before or during clamping.

The mold cavity S1 is formed in a mold cavity area γ range illustrated in FIG. 4. Therefore, the surface of the first half-mold 41 within the mold cavity area γ range corresponds to the first half-molded surface 41a, and the surface of the second half-mold 42 within the mold cavity area γ range corresponds to the second half-molded surface 42a.

Figure 6:
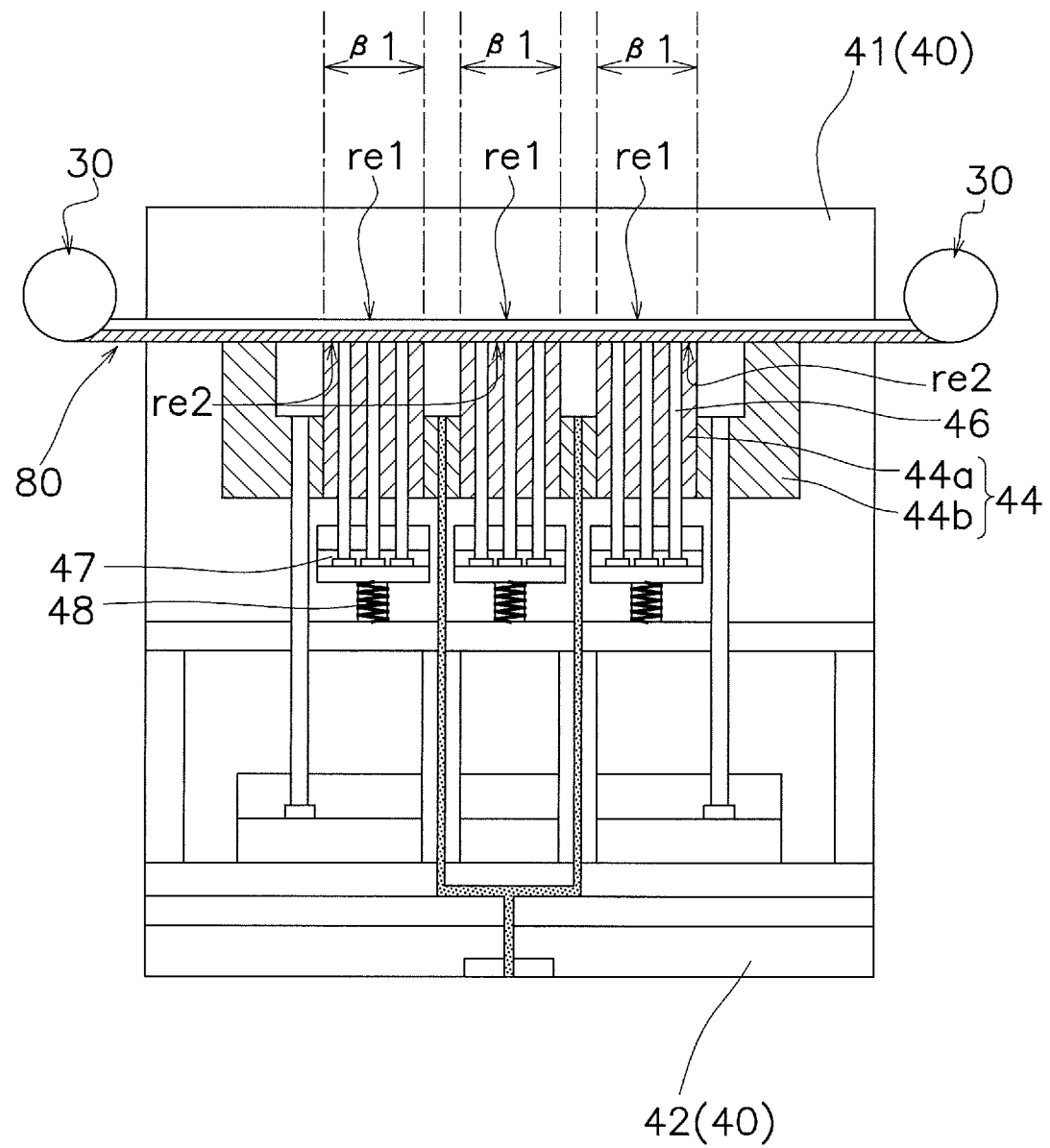
FIG. 6 is a schematic cross-sectional view for illustrating the mold fully clamped.

The state illustrated in FIG. 6 is a state in which the first half-mold 41 and the second half-mold 42 are clamped together. In the clamped state, parting surfaces of the first half-mold 41 and the second half-mold 42 make close contact with each other, and the plurality of knockout pins 46 retreat so far back as to be housed in the second half-mold 42. Non-transfer areas β1 illustrated in FIG. 6 correspond to the openings 11a in the case lid 11. In the description below, a direction in which the first half-mold 41 and the second half-mold 42 relatively approach each other and move away from each other during clamping and release, respectively, is referred to as a "release direction." As viewed in the release direction, the three non-transfer areas β1 illustrated in FIG. 6 overlap with the three openings 11a, three first areas re1 in the first half-molded surface 41a of the first half-mold 41, and three second areas re2 in the second half-molded surface 42a in the second half-mold 42. The plurality of first areas re1 in the first half-mold 41 and the plurality of second areas re2 in the second half-mold 42 make close contact with each other and sandwich the transfer sheet 80 therebetween. Therefore, because the molten resin does not seep into the space between the first area re1 of the first half-mold 41 and the second area re2 of the second half-mold 42 during the injection molding, the opening 11a is formed at the portion where the first area re1 and the second area re2 overlap.

Figure 7:
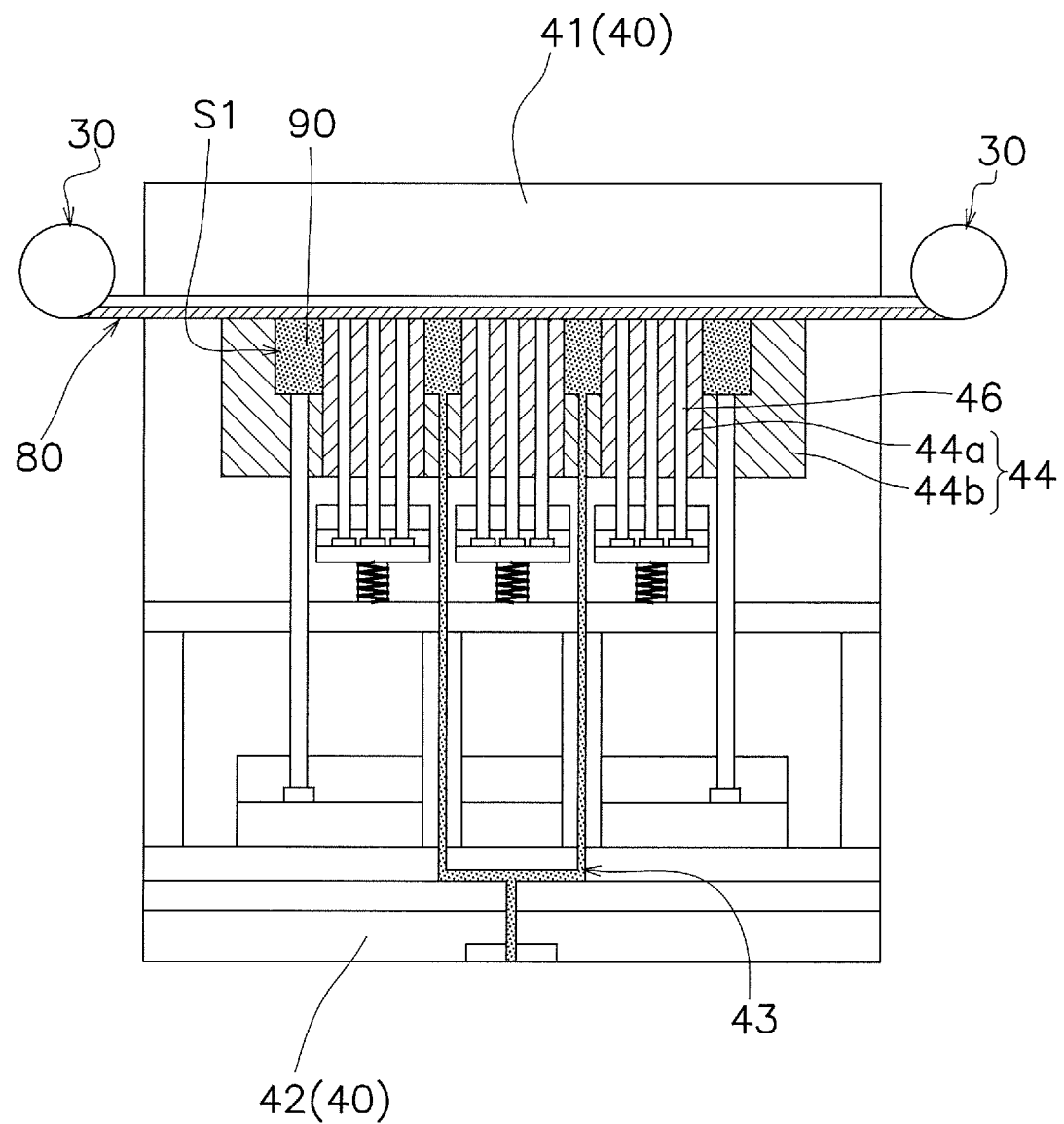
FIG. 7 is a schematic cross-sectional view for illustrating the mold during an injection step.

FIG. 7 illustrates an injection step of injecting a molten resin 90 into the mold cavity S1 that is formed by the first half-mold 41 and the second half-mold 42. In the injection step, the molten resin 90 is injected into the mold cavity S1 through the runner portion 43 to fill the mold cavity S1. The molten resin 90 in the mold cavity S1 is then cooled and hardened, to thereby form the injection molded product 14 of the case lid 11. At this time, the heat and pressure of the molten resin 90 causes the transfer layer 82 of the transfer sheet 80 to be transferred onto the surface of the injection molded product 14, to thereby form the decorative layer 13.

Figure 8:
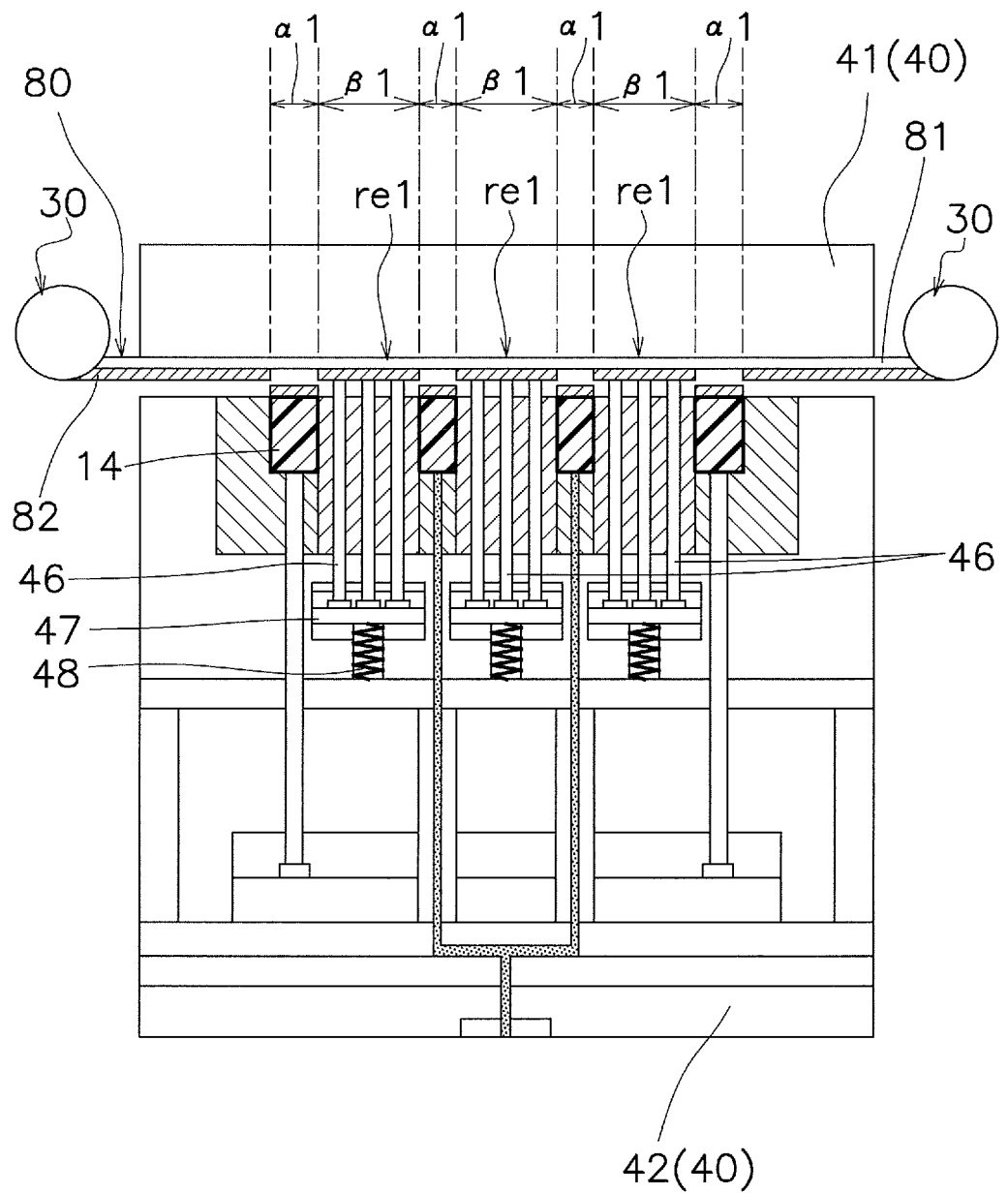
FIG. 8 is a schematic cross-sectional view for illustrating the mold at the start of release.
Figure 9:
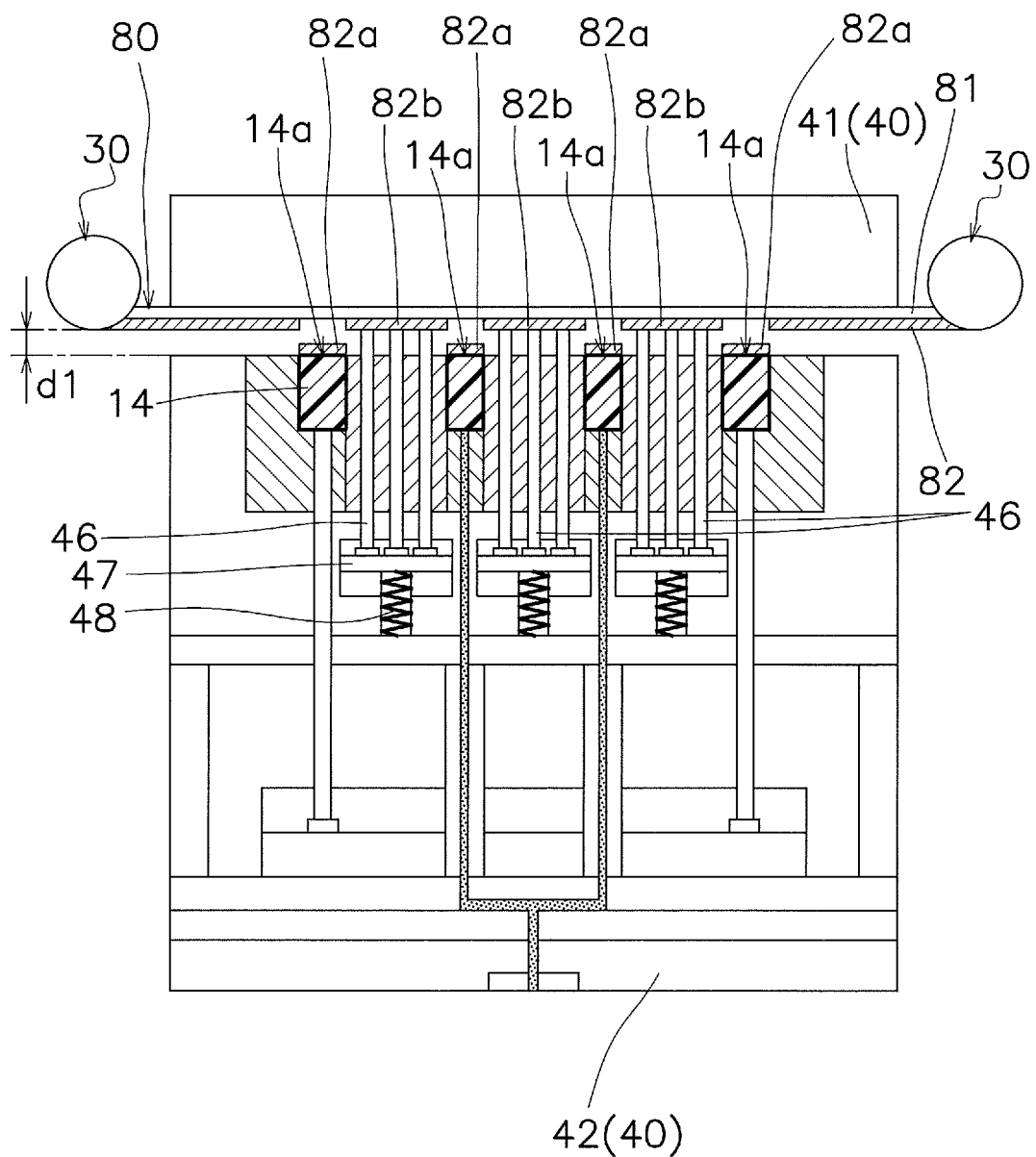
FIG. 9 is a schematic cross-sectional view for illustrating the mold at a knockout pin forward limit.
Figure 10:
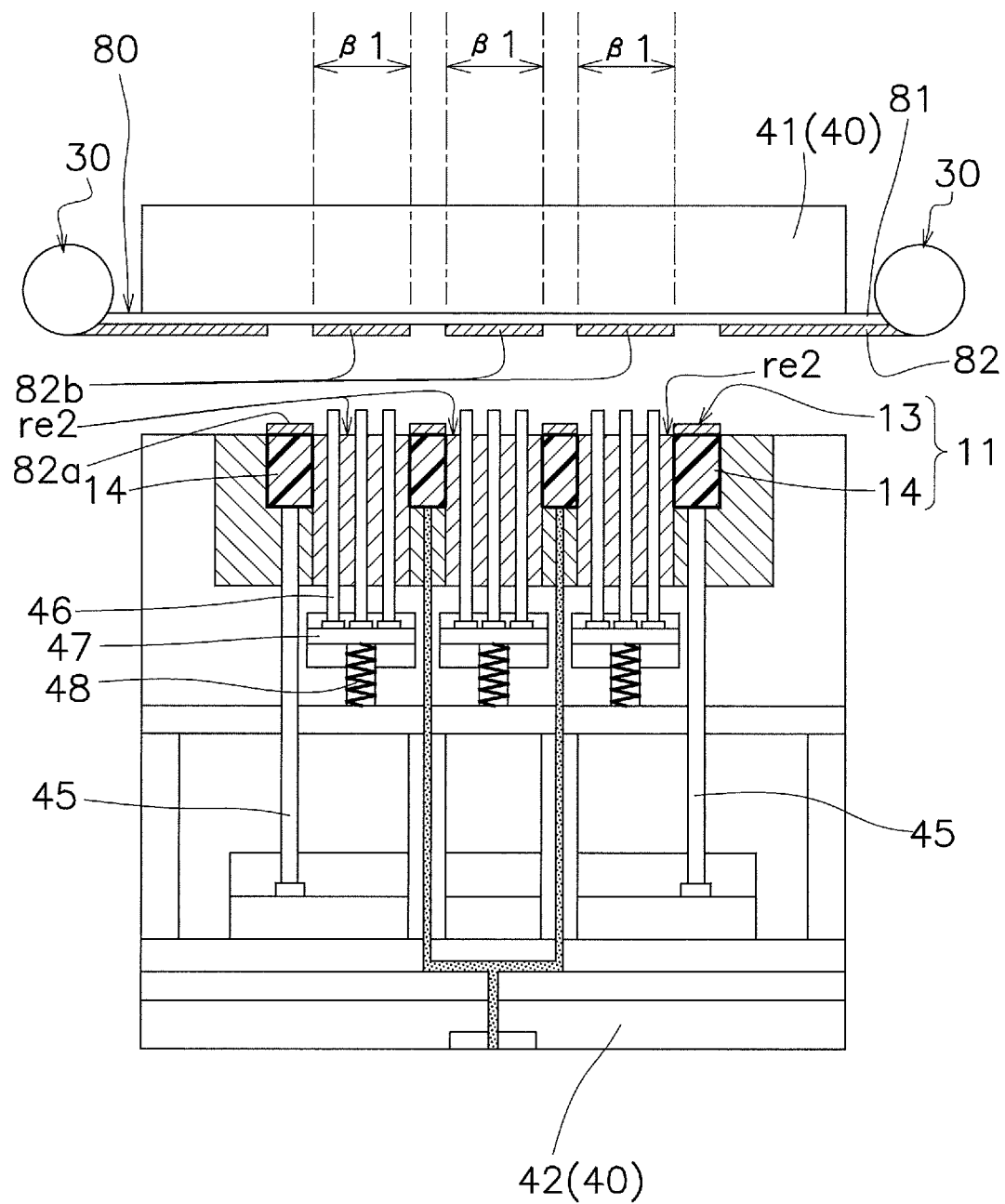
FIG. 10 is a schematic cross-sectional view for illustrating the mold in a state in which the mold has been released further than in the state illustrated in FIG. 9.

FIGS. 8 to 10 illustrate a release step. When the release starts and the transfer sheet 80 begins to separate from the second half-mold 42 together with the first half-mold 41, the plurality of knockout pins 46 are also pushed by the springs 48 to begin to advance with the first half-mold 41 and the transfer sheet 80. As a result, the plurality of knockout pins 46 continue to press the transfer sheet 80 against the first half-mold 41 until the first half-mold 41 and the second half-mold 42 open to a predetermined interval d1 illustrated in FIG. 9 after the start of the release. In FIG. 9, a state in which the transfer 80 and the second half-mold 42 are opened to the predetermined interval d1 is illustrated, but because the transfer sheet 80 is extremely thin, the interval between the transfer sheet 80 and the second half-mold 42 is substantially equal to the interval between the first half-mold 41 and the second half-mold 42.

As illustrated in FIGS. 8 and 9, the plurality of knockout pins 46 are pushed by the spring 48 to advance, and press the transfer layer 82 of the non-transfer area β1 that is to remain on the transfer sheet 80 against the first half-mold 41. The plurality of knockout pins 46 can maintain a state in which a transfer layer 82b in the non-transfer area β1 is cut out from a transfer area 82a (decorative layer 13) in a transfer area α1 that is transferred onto the one primary surface 14a of the injection molded product 14, and then attached to the base film 81.

As illustrated in FIG. 9, the transfer layer 82b is pushed against the first half-mold 41 until the first half-mold 41 and the second half-mold 42 open to the predetermined interval d1, but the plurality of knockout pins 46 stop moving forward when the metal plate member 47 abuts against the second half-mold 42 at a time when the first half-mold 41 and the second half-mold 42 separate from each other by the predetermined interval d1. In other words, a forward limit of the knockout pin 46 is illustrated in FIG. 9. Therefore, when the first half-mold 41 and the second half-mold 42 separate from the state illustrated in FIG. 9 to the state illustrated in FIG. 10, the plurality of knockout pins 46 do not come into contact with the transfer sheet 80. In the state illustrated in FIG. 10, the transfer layer 82b in the non-transfer area β1 that corresponds to the opening 11a (refer to FIG. 3) does not remain in the second area re2 of the second half-mold 42, and the occurrence of foil burr is decreased. From the state illustrated in FIG. 10, the ejector pin 45 protrudes from the second half-mold 42, and the case lid 11, which is the decorative molding, is removed from the second half-mold 42. A state in which the ejector pin 45 protrudes from the second half-mold 42 is the state illustrated in FIG. 3.

(4) SHAPE AND ARRANGEMENT OF KNOCKOUT PINS 46

A concept in which a plurality of the knockout pins 46 are arranged in one opening 11a is illustrated in FIGS. 3 to 10, but specific examples of the arrangement of the knockout pins 46 are described below.

(4-1) First Arrangement Example of Knockout Pins

Figure 11A:
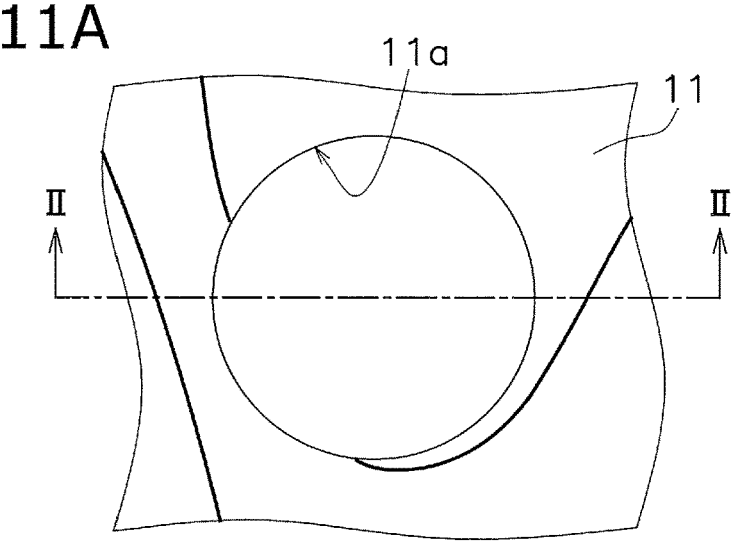
FIG. 11A is an enlarged plan view for illustrating the case lid in which an opening and surrounding portions have been enlarged.
Figure 11B:
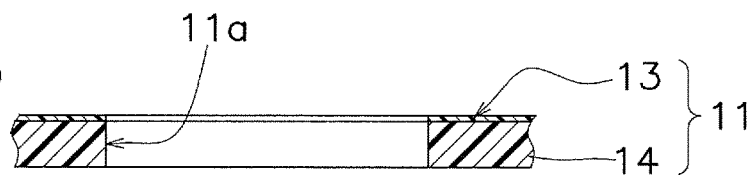
FIG. 11B is an enlarged cross-sectional view for illustrating the case lid along the line II-II in FIG. 11A.

A first arrangement example of the knockout pins is described with reference to FIGS. 11A to 11D. FIG. 11A illustrates the opening 11a of the case lid 11, which is the decorative molding, and a vicinity thereof in an enlarged manner. FIG. 11B illustrates a cross section cut along the line II-II. The opening 11a illustrated in FIGS. 11A and 11B is circular.

Figure 11C:
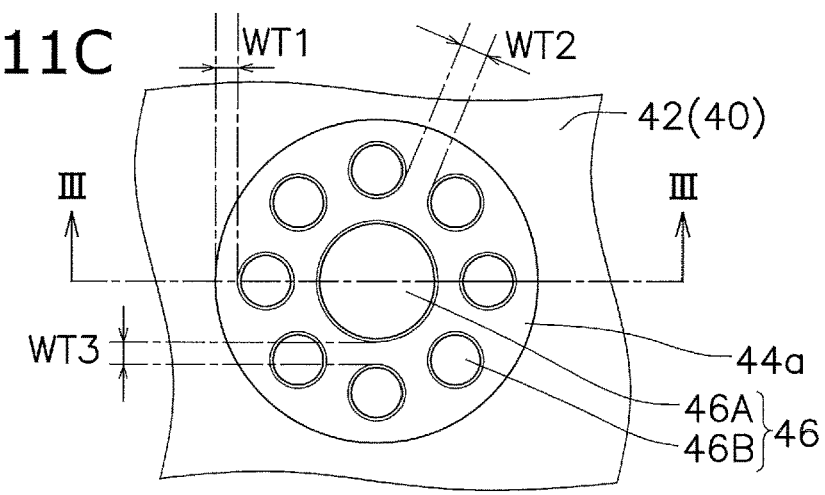
FIG. 11C is an enlarged plan view of the second half-mold for illustrating a first arrangement example of knockout pins for the opening illustrated in FIG. 11A.
Figure 11D:
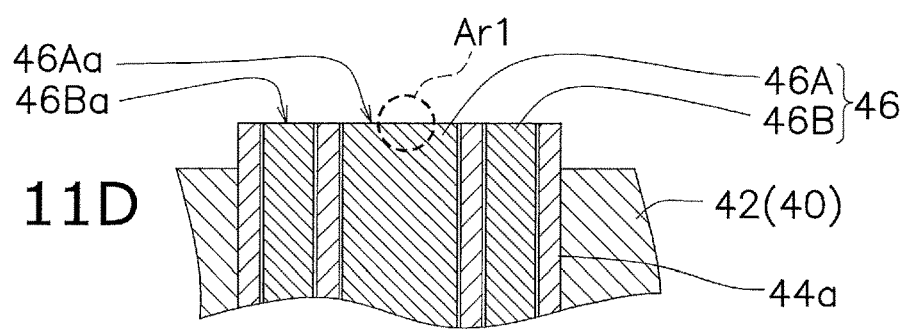
FIG. 11D is an enlarged cross-sectional view for illustrating the second half-mold along the line in FIG. 11C.

FIG. 11C illustrates a flat shape of a part of the parting surface of the second half-mold 42. FIG. 11D illustrates a cross-sectional shape of the insert 44a and the knockout pin 46 along the line III-III. The plurality of knockout pins 46 includes two types of knockout pins 46, that is, a cylindrical large-diameter knockout pin 46A, and a cylindrical small-diameter knockout pin 46B that has a diameter smaller than that of the knockout pin 46A. In terms of abutment against the transfer sheet 80, naturally, an area of a tip surface 46Aa of the large-diameter pin 46A that abuts against the transfer sheet 80 is larger than an area of a tip surface 46Ba of the small-diameter pin 46B that abuts against the transfer sheet 80.

By arranging the small-diameter knockout pins 46B evenly around the large-diameter knockout pins 46A, compared to a case in which only the small-diameter knockout pins 46B are arranged, the number of pins can be reduced. In addition, by adopting an arrangement such as the one illustrated in FIG. 11C, a thickness WT1 from the knockout pin 46 to the outer periphery of the insert 44a can easily be reduced compared to a case in which only the large-diameter knockout pins 46A are arranged. As a result, the distance from the knockout pin 46 to a side surface of the opening 11a becomes shorter, and hence it is easy to cut off the transfer layer 82b without the transfer layer 82b remaining (refer to FIG. 10). On the other hand, a thickness WT2 of the insert 44a between two adjacent small-diameter knockout pins 46B and a thickness WT3 of the insert 44a between the large-diameter knockout pin 46A and the small-diameter knockout pin 46B can be made relatively larger, and hence a plurality of types of knockout pins 46 having varying diameters can be used to more easily reduce a loss of strength in in the insert 44a (second half-mold 42). In this embodiment, the two types of cylindrical knockout pins 46A, 46B having different diameters are used, but three or more types of knockout pins 46 having different diameters can be used. In addition, the shape of the knockout pin 46 is not limited to the cylindrical shape, and a cross-sectional shape of a column-shaped knockout pin 46 can be a polygon or an ellipse, or can be a more complicated shape.

(4-2) Second Arrangement Example of Knockout Pins

Next, a second arrangement example of the knockout pins is described with reference to FIGS. 12A to 12E. As illustrated in FIG. 12A, one knockout pin 46 can be arranged in the insert 44a that has a circular outer periphery to correspond to the circular opening 11a illustrated in FIG. 11A. In terms of durability of the mold 40, a thickness WT4 from the knockout pin 46 to the outer periphery of the insert 44a is slightly thinner than the thickness WT1 illustrated in FIG. 11C, and hence the durability of the mold 40 slightly decreases compared to the case illustrated in FIG. 11C. However, as illustrated in FIG. 12A, the outer periphery of the knockout pin 46 can be arranged at a substantially equal distance from the outer periphery of the insert 44a. As a result, the transfer layer 82b (refer to FIG. 9) in the non-transfer area β1 (refer to FIG. 8) can be easily cut off from the transfer layer 82a in the transfer area α1 (refer to FIG. 8) without bias.

In FIGS. 12B to 12E, four types of knockout pins 46C, 46D, 46E, and 46F having different cross-sectional shapes are illustrated along the line IV-IV. In FIG. 12B, the shape of the knockout pin 46 is illustrated as a cylindrical shape. When cut at a flat surface orthogonal to the release direction OD illustrated by the arrow, the cylindrical knockout pin 46C illustrated in FIG. 12B is a circle that has the same area no matter where the cut is made, and the thickness WT4 of the insert block 44a is also formed to be the same anywhere.

In contrast, the knockout pins 46D, 46E, and 46F illustrated in FIGS. 12C to 12E have tip surfaces 46Da, 46Ea, and 46Fa that have the same area as that of the tip surface 46Ca of the above-mentioned knockout pin 46C. However, a cross-sectional area of the base portions 46Db, 46Eb, and 46Fb orthogonal to the release direction OD is smaller than the area of the tip surfaces 46Da, 46Ea, and 46Fa. Because the area of the base portions 46Db, 46Eb, and 46Fb is small, the area of the insert 44a around the base portions 46Db, 46Eb, and 46Fb can be made larger, and hence the strength of the mold 40 can be more easily guaranteed. The knockout pin 46D illustrated in FIG. 12C has a cylindrical tip portion 46Dc that has a diameter bigger than that of the cylindrical base portion 46Db. The knockout pin 46E illustrated in FIG. 12D has a truncated cone-shaped tip portion 46Ec that has a diameter that becomes smaller toward the cylindrical base portion 46Eb. The knockout pin 46F illustrated in FIG. 12E has a cylindrical tip portion 46Fc that has a diameter larger than that of a cylindrical first supporting portion 461 located at the center of the base portion 46Fb. The base portion 46Fb includes a plurality of cylindrical second supporting portions 462 that are arranged around the first supporting portion 461. The diameters of each of these second supporting portions 462 are smaller than the diameter of the first supporting portion 461.

The shape of the knockout pin 46C is not limited to the cylindrical shape, and a cross-sectional shape of a column-shaped knockout pin 46C can be a polygon or an ellipse, or can be a more complicated shape. In addition, the shape of the base portions 46Db and 46Eb, and the cross-sectional shapes of the first supporting portion 461 and the second supporting portions 462 of the base portion 46Fb, and the tip surfaces 46Dc, 46Ec, and 46Fc of the knockout pins 46D, 46E, and 46F are not limited to the circular shape. For example, the shape of column-shaped base portion 46Db and 46Eb and the cross-sectional shape of the first supporting portion 461 and the second supporting portions 462 of the base portion 46Fb can be a polygon or an ellipse, or can be a more complicated shape. In addition, the shape of the knockout pin 46A illustrated in FIGS. 11C and 11D can be the same shape as that of the knockout pins 46D, 46E, and 46F.

(4-3) Third Arrangement Example of Knockout Pins

Figure 13A:
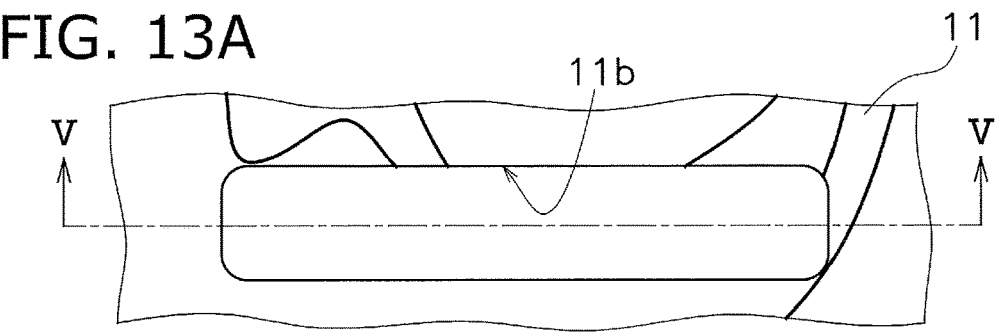
FIG. 13A is an enlarged plan view for illustrating the case lid in which another opening and surrounding portions are enlarged.
Figure 13B:
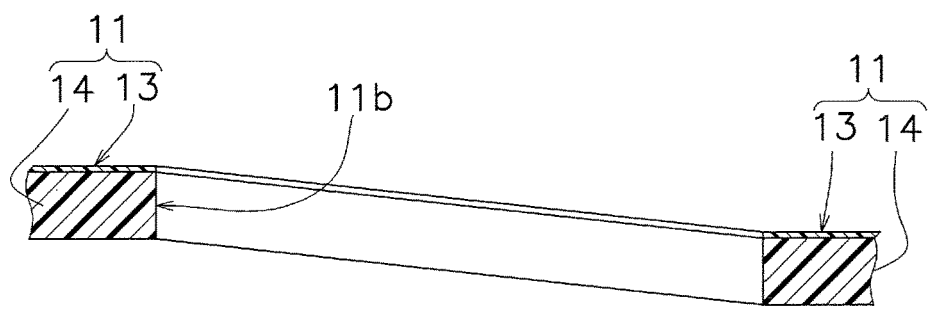
FIG. 13B is an enlarged cross-sectional view for illustrating the case lid along the line V-V in FIG. 13A.

Next, a third arrangement example of the knockout pins 46 is described with reference to FIGS. 13A to 13D. FIG. 13A illustrates another opening 11b of the case lid 11 and the vicinity thereof in an enlarged manner. FIG. 13B illustrates a cross section cut along the line V-V. The opening 11b illustrated in FIGS. 13A and 13B has a substantially rectangular shape, and is formed on an inclined portion of the injection molded product 14 that has a right side that becomes lower than a left side in a longitudinal direction of the opening 11b. Therefore, the opening 11b is inclined toward the decorative layer 13 that extends sideways of the opening 11b.

Figure 13C:
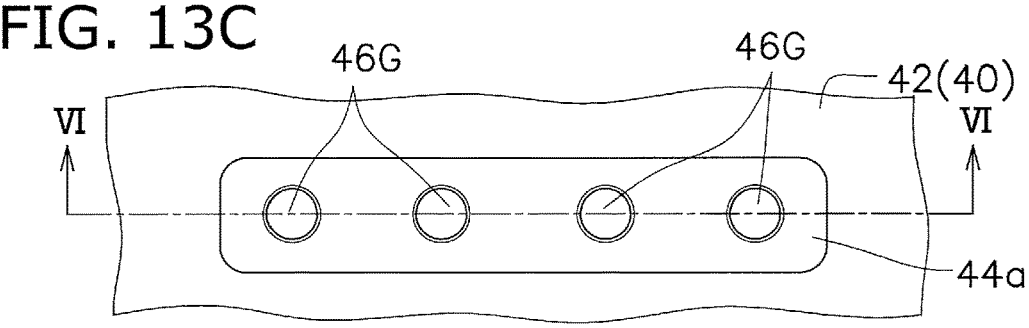
FIG. 13C is an enlarged plan view of the second half-mold for illustrating a third arrangement example of the knockout pins for the opening illustrated in FIG. 13A.
Figure 13D:
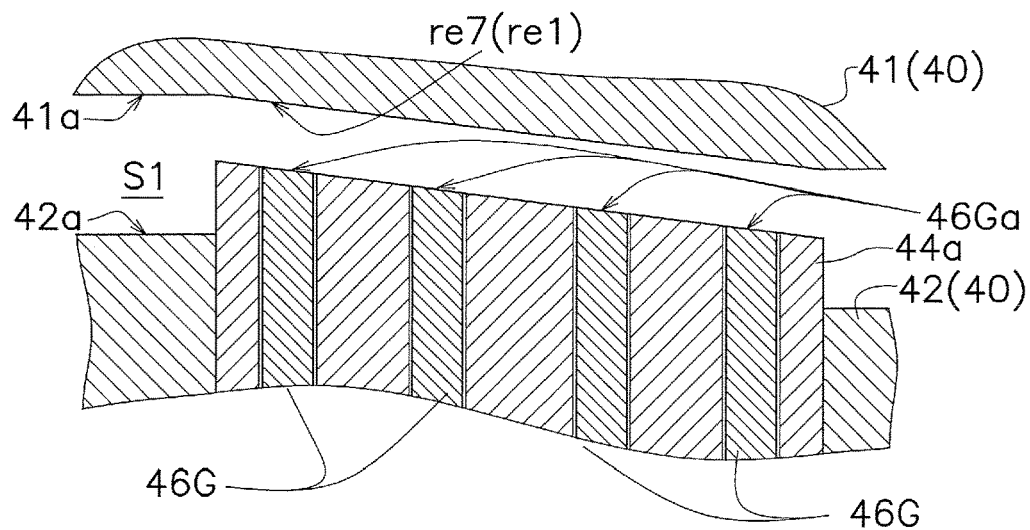
FIG. 13D is an enlarged cross-sectional view for illustrating the second half-mold along the line VI-VI in FIG. 13C.

FIG. 13C illustrates a flat shape of a part of the parting surface of the second half-mold 42. FIG. 13D illustrates a cross-sectional shape of the insert 44a and a knockout pin 46G along the line VI-VI. The transfer sheet 80 is omitted from FIG. 13D. The plurality of knockout pins 46G are cylindrical. However, a tip surface 46Ga of the knockout pin 46G is arranged with respect to an inclined area re7 of the first half-mold 41 that is used to form the mold cavity S1. The inclined area re7 is an area that has a non-flat shape, and is formed in the first half-molded surface 41a (refer to FIG. 3) of the first half-mold 41. In order to sandwich the transfer sheet 80 and cause the knockout pins 46G make close contact with one another in this inclined area re7, the tip surface 46Ga of the knockout pin 46G is inclined in accordance with the shape of the non-flat inclined region re7. More specifically, the tip surface 46Ga of the knockout pin 46G is a surface that is formed when a column is cut at a flat surface inclined toward a center line of the column. In other words, the plurality of knockout pins 46G each have a non-flat shape that is substantially identical to the inclined area re7. In this embodiment, the non-flat shape is described using the inclined area re7 as an example, but the shape of the non-flat area can not be an inclined surface, and can be, for example, a curved surface, an inflection surface, or an uneven surface. Conversely, the flat shape includes a plane that is orthogonal to an advancing and retreating direction of the knockout pin 46G.

For example, in a case where the first half-molded surface 41a of the first half-mold 41 is hemispherical, when only the portion at which the tip of the knockout pin 46 abuts is made flat, the processing the first half-molded surface 41a becomes difficult. In contrast, processing becomes easy when the tip of the knockout pin 46 is processed so as to be spherical.

(4-4) Fourth Arrangement Example of Knockout Pins

Figure 14A:
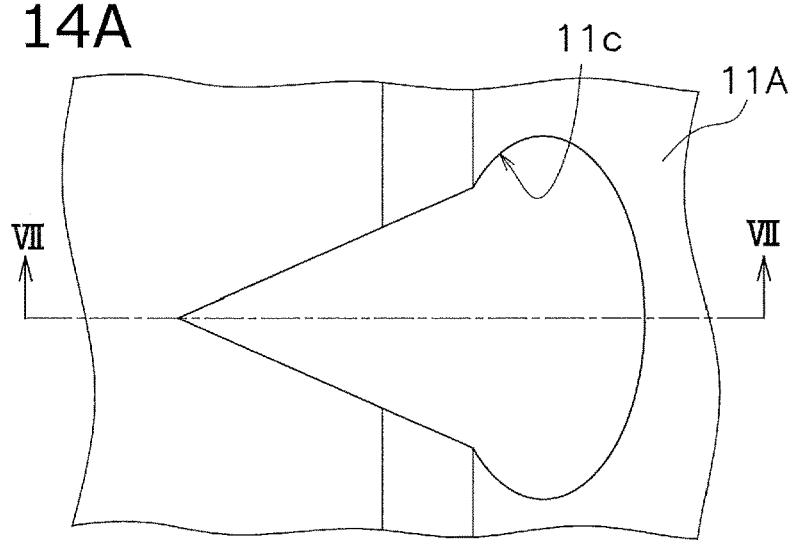
FIG. 14A is an enlarged plan view for illustrating the decorative molding in which an opening and surrounding portions are enlarged.
Figure 14B:
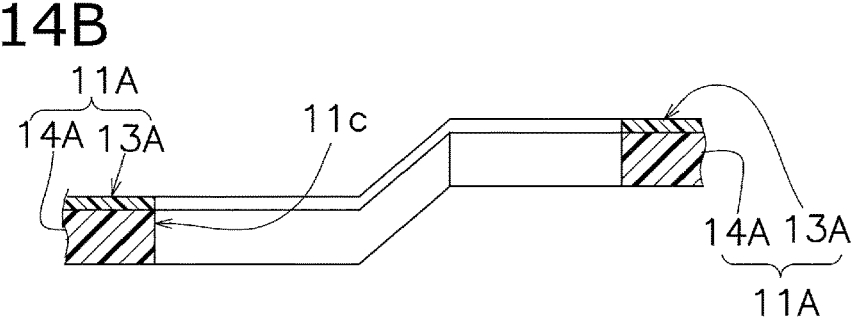
FIG. 14B is an enlarged cross-sectional view for illustrating the decorative molding along the line VII-VII in FIG. 14A.

Next, a fourth arrangement example of the knockout pins 46 is described with reference to FIGS. 14A to 14D. FIG. 14A illustrates another opening 11c of a decorative molding 11A that is different to the case lid 11 illustrated in FIG. 1(A), and the vicinity thereof in an enlarged manner. FIG. 14B illustrates a cross section cut along the line VII-VII. The opening 11c illustrated in FIGS. 14A and 14B has a complicated shape in which an ellipse and a triangle are joined together, and is formed on a step portion of an injection molded product 14A so that a part of the ellipse is higher than a part of the triangle.

Figure 14C:
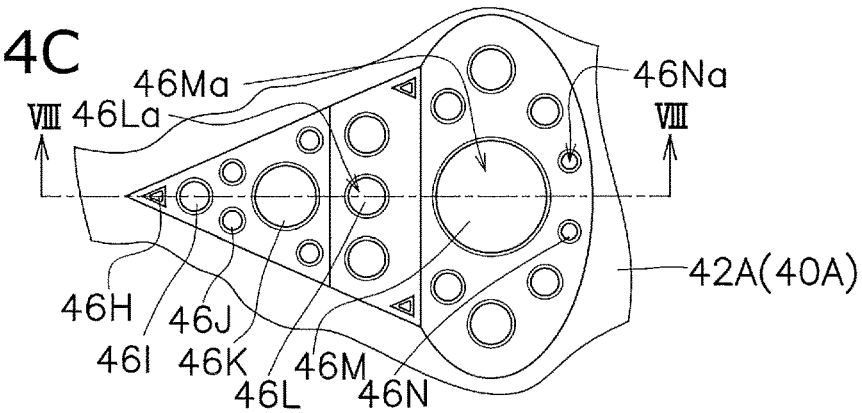
FIG. 14C is an enlarged plan view of the second half-mold for illustrating a fourth arrangement example of the knockout pins that correspond to the opening in FIG. 14A.
Figure 14D:
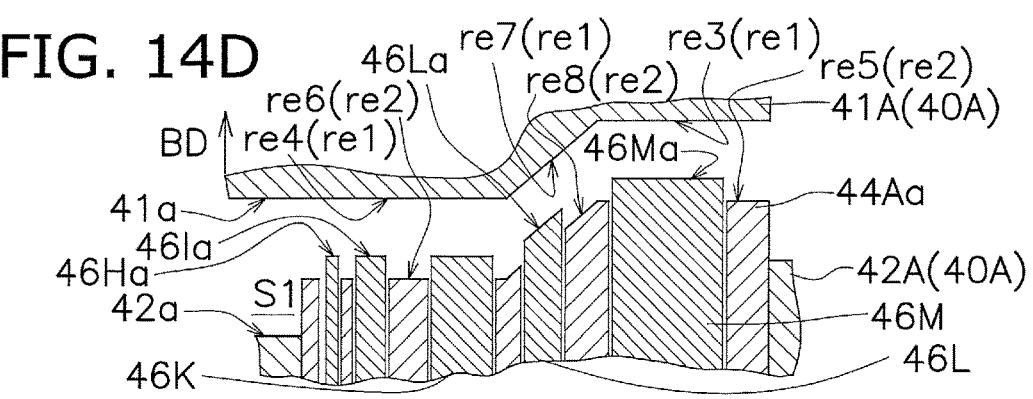
FIG. 14D is an enlarged cross-sectional view for illustrating the second half-mold along the line VIII-VIII in FIG. 14C.

FIG. 14C illustrates a flat shape of a part of the parting surface of a second half-mold 42A. The second half-mold 42A includes columnar knockout pins 46H, 46I, 46J, 46K, 46L, 46M, and 46N that each have different horizontal cross-sectional shapes. In FIG. 14D, an insert 44Aa and the cross-sectional shapes of the knockout pins 46H, 46I, 46K, 46L, and 46M along the line VIII-VIII are illustrated. The transfer sheet 80 is omitted from FIG. 14D.

A tip surface 46La of the knockout pin 46L is arranged in the inclined area re7 of a first half-mold 41A that is used to form the mold cavity S1. In order to sandwich the transfer sheet 80 and cause the transfer sheet 80 to make close contact with the knockout pins 46L in this inclined area re7, the tip surface 46La of the knockout pin 46L is inclined in the same way as the shape of the non-flat inclined area re7.

In order to form the mold cavity S1, the first half-mold 41A includes a third area re3 and a fourth area re4 on either side of the inclined area re7. In contrast, in order to form the mold cavity S1, the second half-mold 42A includes a fifth area re5 that corresponds to the third area re3 and a sixth area re6 that corresponds to the fourth area re4 on either side of an inclined area re8 that corresponds to the inclined area re7. The mold 40A is configured such that, when the first half-mold 41A and the second half-mold 42A are clamped together, the transfer sheet 41A and the second half-mold 42A sandwich the transfer sheet 80 therebetween and also the third area re3 and the fifth area re5 make close contact with each other and the fourth area re4 and the sixth area re6 make close contact with each other. A position of contact between the third area re3 and the fifth area re5 is located closer toward a rear surface of the first half-mold 41A in a back direction BD indicated by the arrow in FIG. 14D than a position of contact between the fourth area re4 and the sixth area re6.

Despite the difference in the position of contact between the third area re3 and the fifth area re5 and the position of contact between the fourth area re4 and the sixth area re6, when the molds are clamped, the knockout pins 46M and 46N arranged in the fifth area re5 and the knockout pins 46H, 46I, 46J, and 46K arranged in the sixth area re6 are configured to push the transfer sheet 80 (refer to FIG. 3) against the third area re3 and the fourth area re4 at substantially the same time. In order to achieve this, the mold 40A is configured such that the knockout pins 46H, 46I, 46J, 46K, 46L, 46M, and 46N all protrude from the second half-mold 42 by the same length, while releasing.

(4-5) Fifth Arrangement Example of Knockout Pins

Figure 15A:
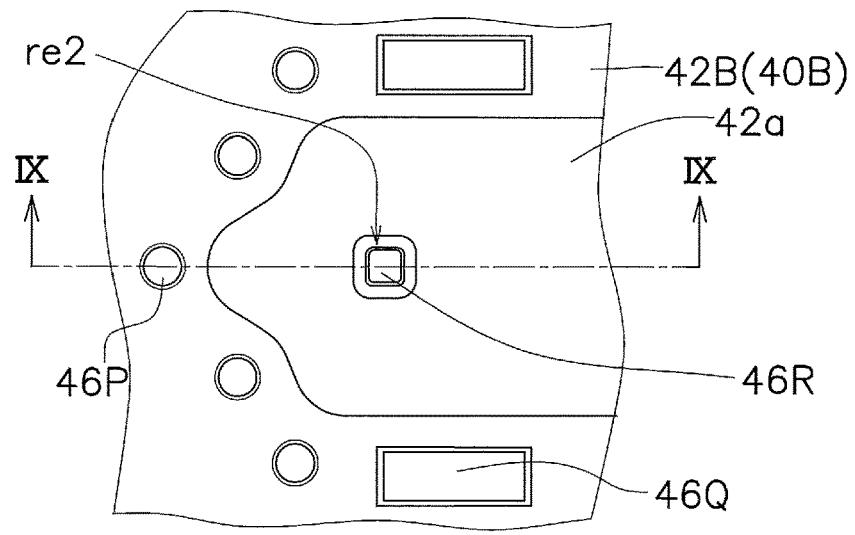
FIG. 15A is an enlarged plan view of the second half-mold for illustrating a fifth arrangement example of the knockout pins.
Figure 15B:
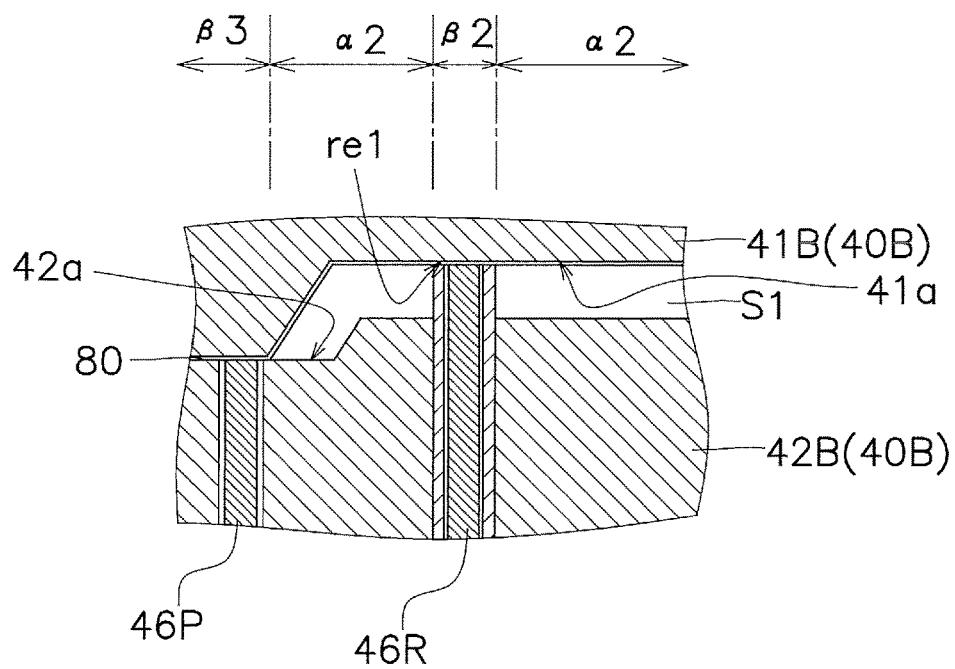
FIG. 15B is an enlarged cross-sectional view for illustrating the second half-mold along the line IX-IX in FIG. 15A.

Next, a fifth arrangement example of the knockout pins 46 is described with reference to FIGS. 15A and 15B. FIG. 15A illustrates a flat shape of a part of a parting surface of a second half-mold 42B. The second half-mold 42B includes columnar knockout pins 46P, 46Q, and 46R that each have different horizontal cross-sectional shapes. In FIG. 15B, the second half-mold 42 and the cross-sectional shapes of the knockout pins 46P and 46R along the line IX-IX are illustrated.

As illustrated in FIG. 15A, the columnar knockout pin 46P and the square column-shape knockout pin 46Q are provided outside the second half-molding surface 42a of the second half-mold 42B that is used to form the mold cavity S1. In contrast, the square column-shape knockout pin 46R is formed inside an area surrounded by the second half-molding surface 42a. Although there is a difference in shape between the columnar knockout pin 46C and the square column-shape knockout pin 46R, the square column-shape knockout pin 46R is the same as the above-mentioned knockout pin 46C in all other aspects.

Other than the non-transfer area β2 that corresponds to the opening, the area around the second half-molding surface 42a as a transfer area α2 is also a non-transfer area β3. The knockout pins 46P and 46Q that are arranged in the non-transfer area β3 do not need to cover all of the second half-molded surface 42a, and are arranged only at places at which foil burr easily occurs, and places at which generation of foil burr can be effectively reduced by the arrangement of the knockout pins 46P and 46Q. The knockout pins 46P and 46Q are configured to freely advance and retreat so to as to advance when the first half-mold 41B and the second half-mold 42B are released, and retreat when the first half-mold 41B and the second half-mold 42B are clamped. Thus, the knockout pins 46P and 46Q push the transfer sheet 80 against the parting surface of the first half-mold 41B.

(5) CONFIGURATION OF KNOCKOUT PIN TIP SURFACE

Before a configuration of the tip surface of the knockout pin 46 is described, the configuration of the transfer sheet 80 is described in more detail. The material of the injection molded product onto which the transfer layer 82 is transferred is also described.

(5-1) Configuration of Transfer Sheet

As described above, the transfer sheet 80 includes the base film 81 and the transfer layer 82.

The base film 81 is made of, for example, polyolefin-based resin, polycarbonate-based resin, or polyethylene terephthalate-based resin. "Polycarbonate-based resin" herein refers to a resin that has a carbonate group (—O—(C=O)—O—) as a structural unit on at least the main chain. Therefore, the polycarbonate-based resin can include a structural unit other than the carbonate group on the main chain. The polyolefin-based resin refers to an olefin homopolymer or copolymer, or a copolymer of those olefins and a monomer component copolymerizable therewith. Examples of the olefins are ethylene, propylene and butene. More specific examples of the olefin-based resin include polyethylene, polypropylene, an ethylene-vinyl acetate copolymer, an ethylene-ethyl acrylate copolymer, an ethylene-acrylic acid copolymer, an ethylene-methyl methacrylate copolymer, an ethylene-α-olefin copolymer, an ethylene-propylene copolymer, and an ethylene-butene copolymer. The polyethylene terephthalate-based resin refers to a resin obtained with an aromatic dicarboxylic acid (for example, terephthalic acid or an ester thereof) or a glycol (for example, ethylene glycol)) as main raw materials, and in which a repeating unit of ethylene terephthalate is present in the molecule of the resin.

For example, the transfer layer 82 includes a patterned layer (not shown) provided with a design, characters, a background pattern, or a color (including metallic luster), a release layer (not shown) used for release from the base film 81, and an adhesive layer (not shown) for making the transfer layer 82 adhere to the injection molded product 14. The release layer can be configured so as to function as a coating layer that protects the patterned layer in the decorative layer 13.

The patterned layer is a layer used to display characters or a pattern, and is formed using, for example, colored ink that includes at least a colorant and a synthetic resin that serves as a binder. The synthetic resin as a binder for the patterned layer is preferably at least one type of synthetic resin selected from the group of a polyvinyl-based resin, a polyamide-based resin, a polyester-based resin, an acrylic resin, a polyurethane-based resin, a polyvinyl acetal-based resin, a polyester urethane-based resin, a cellulose ester-based resin, an alkyd resin, a vinyl chloride vinyl acetate copolymer resin, a thermoplastic urethane-based resin, a methacrylic resin, an acrylate ester-based resin, a chlorinated rubber-based resin, a chlorinated polyethylene-based resin, and a chlorinated polypropylene-based resin. The colorant in the colored ink for the patterned layer is, for example, a pigment or a dye. Examples of the pigment preferably include (1) plant pigments such as indigo, alizarin, carthamin, anthocyanin, flavonoid, and shikonin; (2) food pigments such as azo, xanthene, and triphenylmethane; (3) natural organic pigments such as ocher and terre verte; and (4) calcium carbonate, titanium oxide, aluminum lake, madder lake, and cochineal lake.

In addition, a copolymer, for example, is used in the release layer. Examples of the copolymer include an acrylic (PMMA)-based resin, a polyester-based resin, and a vinyl chloride-vinyl acetate copolymer-based resin. In order to make the release layer hard and increase scratch resistance of resin molded products, a UV-curing resin or an electron beam curing resin, for example, is used. For example, the release layer is formed by being printed on the base film 81 with a printing method. For example, a gravure printing method, a screen printing method, or an offset printing method can be used as the printing method.

For the adhesive layer, a resin having an appropriate heat sensitivity and/or pressure sensitivity for the material of the patterned layer, for example, a PMMA-based resin if the synthetic resin that serves as a binder used in the patterned layer is a PMMA-based resin, is used. The adhesive layer is printed with, for example, a gravure printing method or a screen printing method.

(5-2) Material of Injection Molded Body

The injection molded body 14 can be colored or not colored, and is made of a transparent, translucent, or opaque thermoplastic resin or elastomer. A generic thermoplastic resin such as a polystyrene-based resin, a polyolefin-based resin, an ABS resin or an AS resin is preferably used as the material of the injection molded body 14. Alternatively, a polycarbonate-based resin, a polyacetal resin, an acrylic resin, a polyethylene terephthalate-based resin, a polybutylene terephthalate resin, an engineering resin (a polysulfone resin, a polyphenylene sulfide-based resin, a polyphenylene oxide-based resin, a polyarylate type resin, or the like), or a polyamide-based resin can be used as the material for the injection molded product 14. Natural rubber or synthetic rubber can also be used as the material for the injection molded product 14. A reinforcing material such as glass fiber or an inorganic filler can also be added to the injection molded product.

(5-3) Tip Surface of Knockout Pin

Figure 16A:
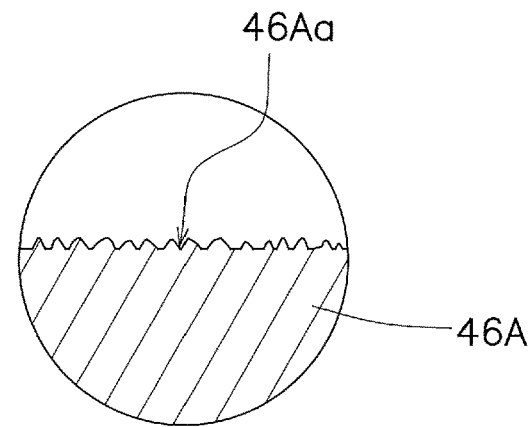
FIG. 16A is an enlarged cross-sectional view for illustrating an example of a tip surface of a knockout pin through enlarging an area Ar1 illustrated in FIG. 11D.

The area Ar1 illustrated in FIG. 11D is illustrated in an enlarged manner in FIG. 16A. The tip surface 46Aa of the knockout pin 46A illustrated in FIG. 16A is given texturing so that the tip surface 46Aa has a finely uneven surface. The finely uneven surface of the tip surface 46Aa makes it possible to easily release the adhesive layer on the transfer layer 82 from the tip surface 46Aa of the knockout pin 46A, and decreases the occurrence of foil burr from transferring to the knockout pin 46A. The finely uneven surface also decreases the probability of occurrence of the transfer sheet 80 from slipping on the tip surface 46Aa of the knockout pin 46A.

In this embodiment, the finely uneven surface of the tip surface 46Aa is formed by texturing, but the finely uneven surface can be formed by, for example, not polishing the tip surface 46Aa after forming the tip surface 46Aa by merely cutting.

Figure 16B:
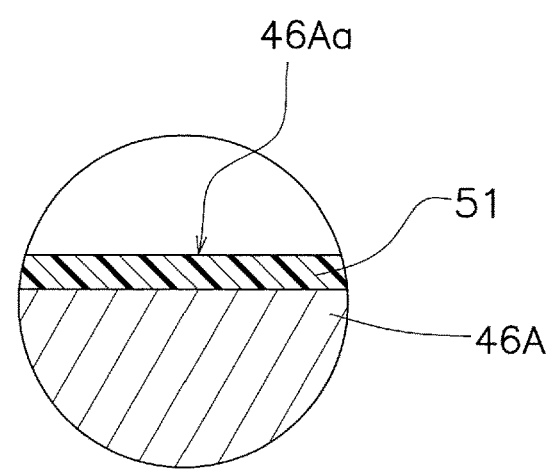
FIG. 16B is an enlarged cross-sectional view for illustrating another example of a tip surface of a knockout pin through enlarging the area Ar1.

FIG. 16B illustrates another example of the tip surface 46Aa of the knockout pin 46A. An elastomer member 51 is attached to the tip surface 46Aa illustrated in FIG. 16B with a predetermined thickness. An example of the material used to form the elastomer member 51 includes a rubber that does not easily adhere to the adhesive layer of the transfer layer 82, such as silicone rubber or fluororubber.

Figure 16C:
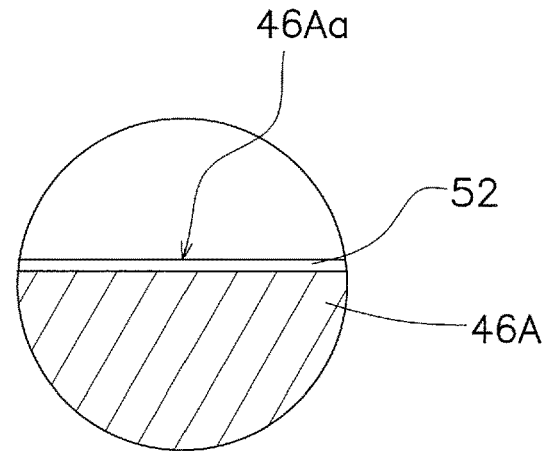
FIG. 16C is an enlarged cross-sectional view for illustrating yet another example of a tip surface of a knockout pin through enlarging the area Ar1.

FIG. 16C illustrates yet another example of the tip surface 46Aa of the knockout pin 46A. A coating layer 52 is formed on the tip surface 46Aa illustrated in FIG. 16C. An example of the material used to form the coating layer 52 includes an organic or inorganic coating that does not easily adhere to the adhesive layer of the transfer layer 82, such as a silicone coating, a ceramic coating, or a fluoride coating.

Figure 17:
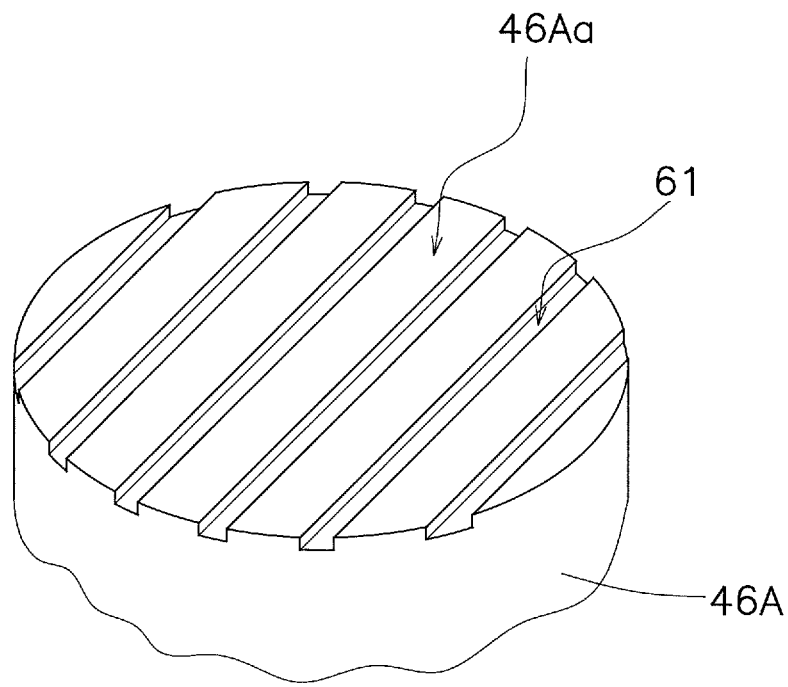
FIG. 17 is an enlarged perspective view for illustrating a knockout pin that has a tip surface formed with slits.
Figure 18:
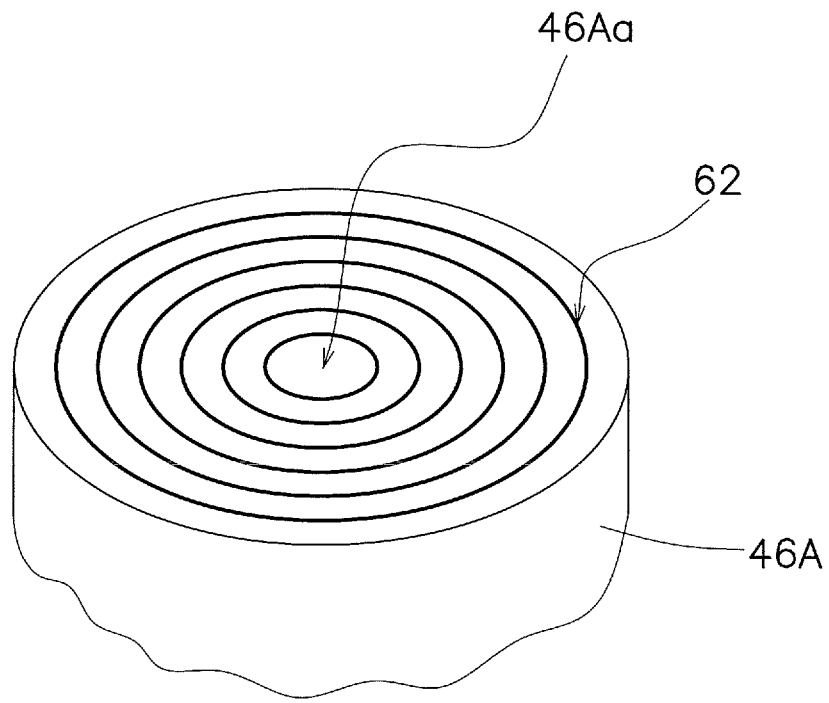
FIG. 18 is an enlarged perspective view for illustrating a knockout pin that has a tip surface formed with knurling.

As illustrated in FIG. 17, a slit 61 can be formed in the tip surface 46Aa of the knockout pin 46A. By forming the slit 61, the area of contact between the adhesive layer of the transfer layer 82 and the tip surface 46Aa can be reduced, and hence the force by which the tip surface 46Aa adheres to the adhesive layer of the transfer layer 82 can be reduced, and the transfer layer 82 does not readily remain on the tip surface 46Aa. As illustrated in FIG. 18, the same effects can be achieved by forming knurling 62 in place of the slit 61 on the tip surface 46Aa.

(6) CHARACTERISTICS (6-1)

As described above, the knockout pin 46, 46A to 46N, 46P to 46R can be caused to advance when the molds are released in a state in which the transfer layer 82b in the non-transfer area β, β1, β2, β3 that remains on the transfer sheet 80, after being transferred simultaneously with the clamping the first half-mold 41, 41A, 41B and the second half-mold 42, 42A, 42B and the injection molding, is sandwiched between at least one knockout pin 46, 46A to 46N, 46P to 46R and the first half-mold 41, 41A, 41B. Because the knockout pin 46, 46A to 46N, 46P to 46R advances until the first half-mold 41, 41A, 41B and the second half-mold 42, 42A, 42B open to the predetermined interval d1, the transfer layer 82a in the non-transfer area β, β1, β2, β3 can be separated from the case lid 11 (example of decorative molding) and the decorative molding 11A. As a result, the probability can be reduced that the transfer layer 82*a* in the non-transfer area β, β1, β2, β3 remains as foil burr on the case lid 11 (example of decorative molding) and the decorative molding 11A, and that the occurrence of the transfer layer 82*a* splattering on the first half-mold 41, 41A, 41B and the second half-mold 42, 42A, 42B can be decreased. In this way, the at least one knockout pin 46, 46A to 46N, 46P to 46R presses the transfer layer 82*a* in the non-transfer area β, β1, β2, β3 that is to remain on the transfer sheet 80 against the first half-mold 41, 41A, 41B, to thereby reduce foil burr at low cost when the case lid 11 and the decorative molding 11A are injection molded.

(6-2)

When the first half-mold 41, 41A, 41B and the second half-mold 42, 42A, 42B are clamped together, injection molding is performed by sandwiching the transfer sheet 80, and causing the first area re1 in the first half-molding surface 41*a* of the first half-mold 41, 41A, 41B that is used to form the first primary surface 14*a* of the injection molded product 14, 14A and the second area re2 in the second half-molding surface 42*a* of the second half-mold 42, 42A, 42B that is used to form the other primary surface 14*b* of the injection molded product 14, 14A to make close contact with each other, to thereby form the at least one opening 11*a*, 11*b*, 11*c* in the injection molded product 14, 14A. At least one knockout pin 46, 46A to 46N, 46P to 46R is caused to advance from the second area re2 when the first half-mold 41, 41A, 41B and the second half-mold 42, 42A, 42B are released from each other, and the non-transfer area β1, β2 in the transfer sheet 80 that corresponds to the opening 11*a*, 11*b*, 11*c* is pressed against the first half-mold 41, 41A, 41B with the knockout pin 46, 46A to 46N, 46P to 46R.

In this way, so that foil burr is not formed at the opening 11*a*, 11*b*, 11*c* when forming the opening 11*a*, 11*b*, 11*c* in the injection molded product 14, 14A, the knockout pin 46, 46A to 46N, 46P to 46R that advances from the second area re2 pushes the non-transfer area β1, β2 against the first area re1, and the transfer layer 82*b* supposed to remain in the non-transfer area β1, β2 that correspond to the opening 11*a*, 11*b*, 11*c* can be left in the transfer sheet 80.

For example, as described with reference to FIG. 11C, there can be adopted a configuration in which a plurality of knockout pins 46A, 46B as a plurality of first knockout pins are provided per one opening 11*a* to press the transfer sheet 80 against the first area re1. When the plurality of first knockout pins are used as described above, the plurality of knockout pins 46A, 46B can be arranged in accordance with the shape of the opening 11*a*, and the probability of generation of foil burr can be substantially reduced regardless of the shape of the opening 11*a*. In addition, while holes used for arranging the plurality of knockout pins 46A, 46B are provided in the second area re2, it is possible to connect the insert 44*a* to a place where the plurality of knockout pins 46A, 46B are not arranged, and hence a loss of strength in the second half-mold 42 can be reduced while still achieving the effect of eliminating foil burr. In addition, similar effects can be achieved by pushing the transfer sheet 80 onto the first area re1 with a plurality of knockout pins 46G as first knockout pins, for the opening 11*b* described above with reference to FIG. 13C. Further, similar effects can be achieved by pushing the transfer sheet 80 onto the first area re1 with a plurality of knockout pins 46H to 46N as first knockout pins corresponding to the opening 11*c* described above with reference to FIG. 14C.

(6-3)

When the knockout pin 46I illustrated in FIG. 14C is regarded as a second knockout pin, the knockout pin 46H can be regarded as a third knockout pin in which the area of the tip surface 46Ha that abuts against the transfer sheet 80 is smaller than that of the tip surface 46I*a* of the knockout pin 46I. When the knockout pin 46M is regarded as a second knockout pin, the knockout pin 46N can be regarded as a third knockout pin in which the area of the tip surface 46Na that abuts against the transfer sheet 80 is smaller than that of the tip surface 46Ma of the knockout pin 46M. In the mold 40A configured as described above, the third knockout pins having a tip surface area smaller than the second knockout pins can be arranged at a complex place in the non-transfer area, and hence a loss of strength in the second half-mold 42 can be reduced, and it is easier to reduce foil burr at the complex place in the non-transfer area.

(6-4)

For example, the at least one knockout pin 46D, 46E, 46F illustrated in FIGS. 12C, 12D and 12E corresponds to a fourth knockout pin that has a tip surface 46Da, 46Ea, 46Fa that abuts against the transfer sheet 80, and a base portion 46Db, 46Eb, 46Fb that extends inward toward the second half-mold 42, and has a cross-sectional area that is orthogonal to the release direction and smaller than the area of the tip surface 46Da, 46Ea, 46Fa. In the mold 40A configured as described above, by reducing the cross-sectional area of the base portion 46Db, 46Eb, 46Fb, a loss of strength in the second half-mold 42 can be reduced due to the arrangement of the knockout pin 46D, 46E, 46F. Further, by increasing the area of the tip surface 46Da, 46Ea, 46Fa, the part that pushes the non-transfer area can be increased, and it is easy to improve the effect of reducing the foil burr generation.

(6-5)

The first half-mold 41A illustrated in FIG. 14D includes the third area re3 and the fourth area re4, and the second half-mold 42 includes the fifth area re5 that corresponds to the third area re3, and the sixth area re6 that corresponds to the fourth area re4. In this mold 40A, a position of contact between the third area re3 and the fifth area re5 via the transfer sheet 80 when the molds are clamped together is located further behind (in the back direction BD) the first half-mold 41A than a position of contact between the fourth area re4 and the sixth area re6. The knockout pin 46 includes knockout pins 46M, 46N as fifth knockout pins arranged in the fifth area re5, and knockout pins 46H, 46I, 46J, 46K as sixth knockout pins arranged in the sixth area re6. The first half-mold 41A and the second half-mold 42A are configured such that, at substantially the same time as when the knockout pins 46M, 46N as the fifth knockout pins push the transfer sheet 80 against the third area re3, the knockout pins 46H, 46I, 46J, 46K as the sixth knockout pins push the transfer sheet 80 against the fourth area re4. In the mold 40A configured as described above, because the knockout pins 46M, 46N as the fifth knockout pins and the knockout pins 46H, 46I, 46J, 46K as the sixth knockout pins can push the transfer sheet 80 onto the third area re3 and the fourth area re4 of the first half-mold 41A at the same time, compared to a case in which the transfer sheet 80 is pushed at different times, the transfer sheet 80 wrinkles less easily, and defective products can be reduced.

(6-6)

For example, the first half-mold 41 illustrated in FIG. 13D includes the inclined area re7 as a seventh area that has a non-flat shape within the first half-molded surface 41*a*. The knockout pin 46G corresponds to the seventh knockout pin that is arranged in the inclined area re7, and has the tip surface 46Ga with a non-flat shape that is substantially the same as that of the inclined area re7. As illustrated in FIG. 14D, the mold 40A includes the knockout pin 46L as a seventh knockout pin. In the mold 40, 40A configured as described above, the transfer sheet 80 can be sandwiched between the inclined area re7 of the first half-mold 41, 41A and the tip surface 46Ga, 46La of the seventh knockout pin with substantially no space therebetween. As a result, the transfer sheet 80 wrinkles less easily, and defective products can be reduced.

(7) MODIFICATION EXAMPLES

(7-1) Modification Example A

In the above-described embodiment, the knockout pin 46, 46A to 46N, 46P to 46R is formed so as to freely advance and retreat parallel in the release direction OD (or the clamping direction), but the knockout pin 46, 46A to 46N, 46P to 46R can be formed so as to freely advance and retreat in the release direction OD at an angle.

(7-2) Modification Example B

In the above-described embodiment, the tip surface 46Aa of the knockout pin 46 is described as being textured, but the tip surface of the knockout pin can be processed as a mirror surface. In some cases, it is easy to release the adhesive layer of the transfer layer 82 from a mirror-surface tip surface.

(7-3) Modification Example C

In the above-described embodiment, the first half-mold 41 and the second half-mold 42 are described using one transfer sheet 80 as an example, but two transfer sheets can be provided to respectively correspond to the primary surface 14a and the other primary surface 14b of the injection molded product 14. Further, these sheets can be transferred onto both sides of the injection molded product 14.

For example, when one transfer area is small, or when holes can be provided in one transfer sheet 80 at the place where the knockout pin 46 is provided, the transfer sheet can be easily transferred onto both sides of the injection molded product 14. When a hole is provided in the transfer sheet 80, for example, the transfer sheet 80 can be cut (hollowed out) outside of the mold 40 before the transfer sheet 80 is fed to the mold cavity, and then the transfer sheet 80 is fed to the mold cavity. The knockout pin 46 can be provided in this cut portion. For example, when holes are provided in the transfer sheet 80 arranged in the first half-mold 41, the knockout pin 46 can be arranged in the first half-mold 41, and foil burr on the second half-mold 42-side can be reduced. When forming a cut portion in the transfer sheet 80 arranged in the second half-mold, contrary to that described above, the first half-mold 41 and the second half-mold 42 can be reversed so that the knockout pin 46 is provided to the second half-mold 42.

While only selected embodiments have been chosen to illustrate the present advancement, it will be apparent to those skilled in the art from this disclosure that various changes and modifications can be made herein without departing from the scope of the disclosure as defined in the appended claims. Furthermore, the foregoing descriptions of the embodiments according to the present disclosure are provided as examples only, and not for the purpose of limiting the disclosure as defined by the appended claims and their equivalents. Thus, the scope of the disclosure is not limited to the disclosed embodiments.

What is claimed is:

1. A mold, comprising:
a first half-mold on which a transfer sheet is to be placed, the first half-mold including a first half-molding surface adapted to form a primary surface of an injection molded product, the sheet including a transfer layer that has a transfer area to be transferred onto the injection molded product at the same time of the injection molding of the product and a non-transfer area that is not to be transferred onto the injection molded product; and
a second half-mold that is to be clamped to the first half-mold, the second half-mold including an insert adapted to form at least one opening in the injection molded product and a plurality of knockout pins in the insert and configured to advance and retreat by a spring or an actuator;
when the first half-mold and the second half-mold are clamped, the insert makes close contact with the first half-molding surface with the transfer sheet sandwiched between the insert and the first half-molding surface, the plurality of knockout pins are pushed by the first half-mold and retract to cause the spring to elastically deform, when the first half-mold and the second half-mold are released from each other, the plurality of knockout pins are pushed by the spring to protrude from the at least one opening and push the non-transfer area against the first half molding surface until the first half-mold and the second half-mold open to a predetermined interval, or
when the first half-mold and the second half-mold are clamped, the insert makes close contact with the first half-molding surface with the transfer sheet sandwiched between the insert and the first half-molding surface, the plurality of knockout pins are retracted by the actuator before or during mold clamping, when the first half-mold and the second half-mold are released from each other, the plurality of knockout pins are pushed by the actuator to protrude from the at least one opening and push the non-transfer area against the first half molding surface until the first half-mold and the second half-mold open to a predetermined interval.

2. The mold according to claim 1, wherein the first half-molding surface includes a first area corresponding to the at least one opening in the injection molded product,
the second half-mold includes, in a second half-molding surface used for forming another primary surface of the injection molded product, a second area to be making close contact with the first area, with the transfer sheet sandwiched between the areas, when the molds are clamped together, and the second area further includes at least one of the plurality of knockout pins arranged therein, and
the at least one knockout pin arranged in the second area protrudes from the at least one opening to push the non-transfer area against the first area of the first half-mold when the first half-mold and the second half-mold are released from each other.

3. The mold according to claim 2, wherein the plurality of knockout pins includes a plurality of first knockout pins, and the plurality of first knockout pins are arranged in at least one opening in the second half-mold.

4. The mold according to claim 3, wherein the plurality of knockout pins includes a second knockout pin having a tip surface area and a third knockout pin that has a tip surface area smaller than that of the second knockout pin, the tip surfaces configured to abut against the transfer sheet.

5. The mold according to claim 4, wherein the plurality of knockout pins includes a fourth knockout pin that has a tip surface to abut against the transfer sheet and a base portion extending inward toward the second half-mold and having a cross-sectional area that is orthogonal to a release direction and smaller than an area of the tip surface.

6. The mold according to claim 5, wherein
the first half-mold includes a third area and a fourth area;
the second half-mold includes a fifth area that corresponds to the third area and a sixth area that corresponds to the fourth area, and a position of contact between the third area and the fifth area via the transfer sheet when the molds are clamped together is located closer toward a rear surface of the first half-mold than a position of contact between the fourth area and the sixth area;
the plurality of knockout pins includes a fifth knockout pin arranged in the fifth area and a sixth knockout pin arranged in the sixth area, and
the first half-mold and the second half-mold are configured such that, at substantially the same time as when the fifth knockout pin pushes the transfer sheet against the third area, the sixth knockout pin pushes the transfer sheet against the fourth area.

7. The mold according to claim 2, wherein
the first half-mold includes an area that has a non-flat shape in the first half-molding surface, and
the plurality of knockout pins includes a knockout pin that is arranged in the area that has a non-flat shape and that has a tip surface, the tip surface having a non-flat shape that is substantially the same as that of the area that has a non-flat shape.

8. The mold according to claim 3, wherein
the first half-mold includes an area that has a non-flat shape in the first half-half-molding surface, and
the plurality of knockout pins includes a knockout pin that is arranged in the area that has a non-flat shape and that has a tip surface, the tip surface having a non-flat shape that is substantially the same as that of the area that has a non-flat shape.

9. The mold according to claim 1, wherein the plurality of knockout pins includes a first knockout pin having a tip surface area and a second knockout pin that has a tip surface area smaller than that of the first knockout pin, the tip surfaces configured to abut against the transfer sheet.

10. The mold according to claim 1, wherein the plurality of knockout pins includes a knockout pin that has a tip surface to abut against the transfer sheet and a base portion extending inward toward the second half-mold and having a cross-sectional area that is orthogonal to a release direction and smaller than an area of the tip surface.

11. The mold according to claim 3, wherein the plurality of knockout pins includes a knockout pin that has a tip surface to abut against the transfer sheet and a base portion extending inward toward the second half-mold and having a cross-sectional area that is orthogonal to a release direction and smaller than an area of the tip surface.

12. The mold according to claim 1, wherein
the first half-mold includes a third area and a fourth area;
the second half-mold includes a second area, a fifth area that corresponds to the third area and a sixth area that corresponds to the fourth area, and a position of contact between the third area and the fifth area via the transfer sheet when the molds are clamped together is located closer toward a rear surface of the first half-mold than a position of contact between the fourth area and the sixth area;
the plurality of knockout pins includes a fifth knockout pin arranged in the fifth area and a sixth knockout pin arranged in the sixth area, and
the first half-mold and the second half-mold are configured such that, at substantially the same time as when the fifth knockout pin pushes the transfer sheet against the third area, the sixth knockout pin pushes the transfer sheet against the fourth area.

13. The mold according to claim 3, wherein
the first half-mold includes a third area and a fourth area;
the second half-mold includes a fifth area that corresponds to the third area and a sixth area that corresponds to the fourth area, and a position of contact between the third area and the fifth area via the transfer sheet when the molds are clamped together is located closer toward a rear surface of the first half-mold than a position of contact between the fourth area and the sixth area;
the plurality of knockout pins includes a fifth knockout pin arranged in the fifth area and a sixth knockout pin arranged in the sixth area, and
the first half-mold and the second half-mold are configured such that, at substantially the same time as when the fifth knockout pin pushes the transfer sheet against the third area, the sixth knockout pin pushes the transfer sheet against the fourth area.

14. A method for manufacturing a decorative molding, comprising:
placing a transfer sheet onto a first half-mold, the sheet including a transfer layer that has a transfer area to be transferred onto an injection molded product and a non-transfer area that is not to be transferred onto the injection molded product;
transferring the transfer layer onto the injection molded product from the transfer sheet simultaneously with performing of injection molding in which at least one knockout pin located in a second half-mold is caused to retreat so as to clamp the first half-mold and the second half-mold together, the second half-mold including an engraved surface configured to form a surface of the injection molded product; and
releasing the first half-mold and the second half-mold from each other while the at least one knockout pin is caused to advance until the second half-mold and the first half-mold open to a predetermined interval and the transfer layer in the non-transfer area remaining on the transfer sheet is pressed against the first half-mold using the at least one knockout pin;
wherein
the first half-mold has a first half-molding surface adapted to form a primary surface of the injection molded product,
the second-half mold has an insert for forming at least one opening in the injection molded product,
the at least one knockout pin includes a plurality of knockout pins located in the insert of the second-half mold,
when the first-half mold and the second-half mold are clamped, the plurality of knockout pins retreat, and the insert and the first half-molding surface sandwich the transfer sheet,
when the transfer layer is transferred onto the injection molded product from the transfer sheet simultaneously with performing of injection molding, the insert forms the at least one opening in the injection molded product, and
the first half-mold and the second half-mold are released from each other while the plurality of knockout pins project from the at least one opening and press the non-transfer area against the first half-molding surface until the first half mold and the second half-mold open to a predetermined interval.

15. A method for manufacturing a decorative molding, comprising:
placing a transfer sheet onto a first half-mold, the sheet including a transfer layer that has a transfer area to be transferred onto an injection molded product and a non-transfer area that is not to be transferred onto the injection molded product;
transferring the transfer layer onto the injection molded product from the transfer sheet simultaneously with performing of injection molding in which at least one knockout pin located in a second half-mold is caused to retreat so as to clamp the first half-mold and the second half-mold together, the second half-mold including an engraved surface configured to form a surface of the injection molded product; and
releasing the first half-mold and the second half-mold from each other while the at least one knockout pin is caused to advance until the second half-mold and the first half-mold open to a predetermined interval and the transfer layer in the non-transfer area remaining on the transfer sheet is pressed against the first half-mold using the at least one knockout pin;
wherein
the first half-mold has a first half-molding surface adapted to form a primary surface of the injection molded product,
the second-half mold has an insert for forming at least one opening in the injection molded product,
the at least one knockout pin has a tip surface and a base portion located in the insert of the second-half mold, the tip surface adapted to abut against the transfer sheet, the base portion extending inward toward the second half-mold and having a cross sectional area that is orthogonal to a release direction and smaller than an area of the tip surface and the at least one knockout pin is located in the insert,
the first half-mold and the second half-mold are released from each other while the at least one knockout pin project from the at least one opening and press the non-transfer area against the first half-molding surface until the first half mold and the second half-mold open to a predetermined interval.

16. A mold, comprising:
a first half-mold on which a transfer sheet is to be placed, the first half-mold including a first half-molding surface adapted to form a primary surface of an injection molded product, the sheet including a transfer layer that has a transfer area to be transferred onto the injection molded product at the same time of the injection molding of the product and a non-transfer area that is not to be transferred onto the injection molded product; and a second half-mold that is to be clamped to the first half-mold, the second half-mold including an insert adapted to form at least one opening in the injection molded product and at least one knockout pin having a tip surface adapted to abut against the transfer sheet and a base portion extending inward toward the second half half-mold and having a cross cross-sectional area that is orthogonal to a release direction and smaller than an area of the tip surface, the at least one knockout pin configured to freely advance and retreat by a spring or an actuator in order to push the transfer layer in the non-transfer area that is to remain on the transfer sheet against the first half-mold until the second half-mold and the first half-mold open to a predetermined interval when the molds are released from each other;

when the first half-mold and the second half-mold are clamped, the insert makes close contact with the first half-molding surface with the transfer sheet sandwiched between the insert and the first half-molding surface, the at least one knockout pin is pushed by the first half-mold and retract to cause the spring to elastically deform, when the first half-mold and the second half-mold are released from each other, the at least one knockout pin is pushed by the spring to protrude from the at least one opening and to push the non-transfer area against the first half molding surface until the first half-mold and the second half-mold open to a predetermined interval, or when the first half-mold and the second half-mold are clamped, the insert makes close contact with the first half-molding surface with the transfer sheet sandwiched between the insert and the first half-molding surface, the at least one knockout pin is retracted by the actuator before or during mold clamping, when the first half-mold and the second half-mold are released from each other, the at least one knockout pin is pushed by the actuator to protrude from the at least one opening and to push the non-transfer area against the first half molding surface until the first half-mold and the second half-mold open to a predetermined interval.

\* \* \* \* \*